(12) United States Patent
Choi et al.

(10) Patent No.: US 12,333,396 B2
(45) Date of Patent: Jun. 17, 2025

(54) SYSTEM, METHOD, AND COMPUTER PROGRAM PRODUCT FOR REDUCING DATASET BIASES IN NATURAL LANGUAGE INFERENCE TASKS USING UNADVERSARIAL TRAINING

(71) Applicant: Visa International Service Association, San Francisco, CA (US)

(72) Inventors: Minje Choi, Ann Arbor, MI (US); Javid Ebrahimi, Redwood City, CA (US); Wei Zhang, Fremont, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 18/845,615

(22) PCT Filed: May 10, 2023

(86) PCT No.: PCT/US2023/021709
§ 371 (c)(1),
(2) Date: Sep. 10, 2024

(87) PCT Pub. No.: WO2023/220159
PCT Pub. Date: Nov. 16, 2023

(65) Prior Publication Data
US 2025/0111277 A1 Apr. 3, 2025

Related U.S. Application Data

(60) Provisional application No. 63/340,132, filed on May 10, 2022.

(51) Int. Cl.
*G06N 20/00* (2019.01)

(52) U.S. Cl.
CPC .................................. *G06N 20/00* (2019.01)

(58) Field of Classification Search
CPC ........................................................ G06N 20/00
See application file for complete search history.

(56) References Cited

U.S. PATENT DOCUMENTS

2021/0150340 A1 5/2021 Liu et al.
2021/0358178 A1* 11/2021 Staudigl ............... H04N 19/192

OTHER PUBLICATIONS

Albanie et al., "Stopping FAN Violence: Generative Unadversarial Networks", arXiv preprint arXiv:1703.02528 (2017).
(Continued)

*Primary Examiner* — Dave Misir
(74) *Attorney, Agent, or Firm* — The Webb Law Firm

(57) ABSTRACT

Provided are systems for generating a machine learning model for classification tasks using unadversarial training that include a processor to perform an unadversarial training procedure to train a machine learning model to provide a trained machine learning model. When performing the unadversarial training procedure, the processor is programmed or configured to receive a training dataset including a plurality of training samples; generate a noise vector for the plurality of training samples based on a uniform distribution; perturb each training sample of the plurality of training samples; obtain a gradient; generate an updated noise vector based on the gradient; perturb each training sample of the plurality of training samples based on the updated noise vector; and update a model weight of the machine learning model based on the second plurality of perturbed training samples to provide the trained machine learning model. Methods and computer program products are also provided.

18 Claims, 18 Drawing Sheets

(56) References Cited

OTHER PUBLICATIONS

Belinkov et al., "On Adversarial Removal of Hypothesis-only Bias in Natural Language Inference", arXiv preprint arXiv:1907.04389 (2019).

Clark et al., "Don't take the easy way out: Ensemble based methods for avoiding known dataset biases", Proceedings of the 2019 Conference of Empirical Methods in Natural Language Processing and the 9th International Joint Conference on Natural Language Processing, 2019, pp. 4067-4080.

Clark et al., "Learning to model and ignore dataset bias with mixed capacity ensembles", Proceedings of the 2020 Conference on Empirical Methods in Natural Language Processing: Findings, EMNLP 2020, pp. 3031-3045.

Devlin et al., "BERT: Pre-training of Deep Bidirectional Transformers for Language Understanding/24.05", Proceedings of the 2019 Conference of the North American Chapter of the Association for Computational Linguistics: Human Language Technologies, NAACL-HLT 2019, pp. 4171-4186.

Ghaddar et al., "End-to-end self-debiasing framework for robust NLU training", aFindings of the Association for Computational Linguistics: ACL-IJCNLP 2021, pp. 1923-1929.

Goodfellow et al., "Explaining and harnessing adversarial examples", 3rd International Conference on Learning Representations, ICLR 2015.

Gururangan et al., "Annotation artifacts in natural language inference data", Proceedings of the 2018 Conference of the North American Chapter of the Association for Computational Linguistics: Human Language Technologies, NAACL-HLT, pp. 107-112.

He et al., "Unlearn dataset bias in natural language inference by fitting the residual", Proceedings of the 2nd Workshop on Deep Learning Approaches for Low-Resource NLP, pp. 132-142.

Jiang et al., "Smart: Robust and efficient fine-tuning for pre-trained natural language models through principled regularized optimization", Proceedings of the 58th Annual Meeting of the Association for Computational Linguistics, pp. 2177-2190.

Kingma, "Adam: A method for stochastic optimization", 3rd International Conference on Learning Representations, ICLR 2015.

Lazarou, "Training a GAN to Sample from the Normal Distribution", Towards Data Science, 2020.

Liu et al., "Adversarial training for large neural language models", arXiv preprint arXiv:2004.08994 (2020).

Mahabadi et al., "End-to-end bias mitigation by modelling biases in corpora", Proceedings of the 58th Annual Meeting of the Association for Computational Linguistics, pp. 8706-8716.

Mccoy et al., "Right for the wrong reasons: Diagnosing syntactic heuristics in natural language inference", Proceedings of the 57th Annual Meeting of the Association for Computational Linguistics, pp. 3428-3448.

Miyato et al., "Adversarial training methods for semi-supervised text classification", 5th International Conference on Learning Representations, ICLR 2017.

Mizra et al., "Conditional Generative Adversarial Nets", pp. 1-7.

Papernot et al., "Distillation as a Defense to Adversarial Perturbations against Deep Neural Networks", 37th IEEE Symposium on Security & Privacy, 2016, pp. 1-16.

Poliak et al., "Hypothesis only baselines in natural language inference", Proceedings of the Seventh Joint Conference on Lexical and Computational Semantics, pp. 180-191.

Sagar et al., "Can ML Models Eliminate Bias From Datasets on their Own".

Salman et al., "Unadversarial examples: Designing objects for robust vision", Advances in Neural Information Processing Systems, 2021, pp. 15270-15284, vol. 34.

Sanh et al., "Learning from others' mistakes: Avoiding dataset biases without modeling them", 9th International Conference on Learning Representations, ICLR 2021.

Schuster et al., "Towards debiasing fact verification models", Proceedings of the 2019 Conference on Empirical Methods in Natural Language Processing and the 9th International Joint Conference on Natural Language Processing, EMNLP-IJCNLP 2019, pp. 3417-3423.

Turc et al., "Well-read students learn better: The impact of student initialization on knowledge distillation", arXiv preprint arXiv:1908.08962 13 (2019): 3.

Utama et al., "Towards debiasing NLU models from unknown biases", Proceedings of the 2020 Conference on Empirical Methods in Natural Language Processing (EMNLP), pp. 7597-7610.

Williams et al., "A broad-coverage challenge corpus for sentence understanding through inference", Proceedings of the 2018 Conference of the North American Chapter of the Association for Computational Linguistics: Human Language Technologies, pp. 1112-1122, vol. 1.

Wong et al., "Fast is better than free: Revisiting adversarial training", 8th International Conference on Learning Representations, ICLR 2020, 2020.

Zhu et al., "Freelb: Enhanced adversarial training for natural language understanding", 8th International Conference on Learning Representations, ICLR 2020, 2020.

\* cited by examiner

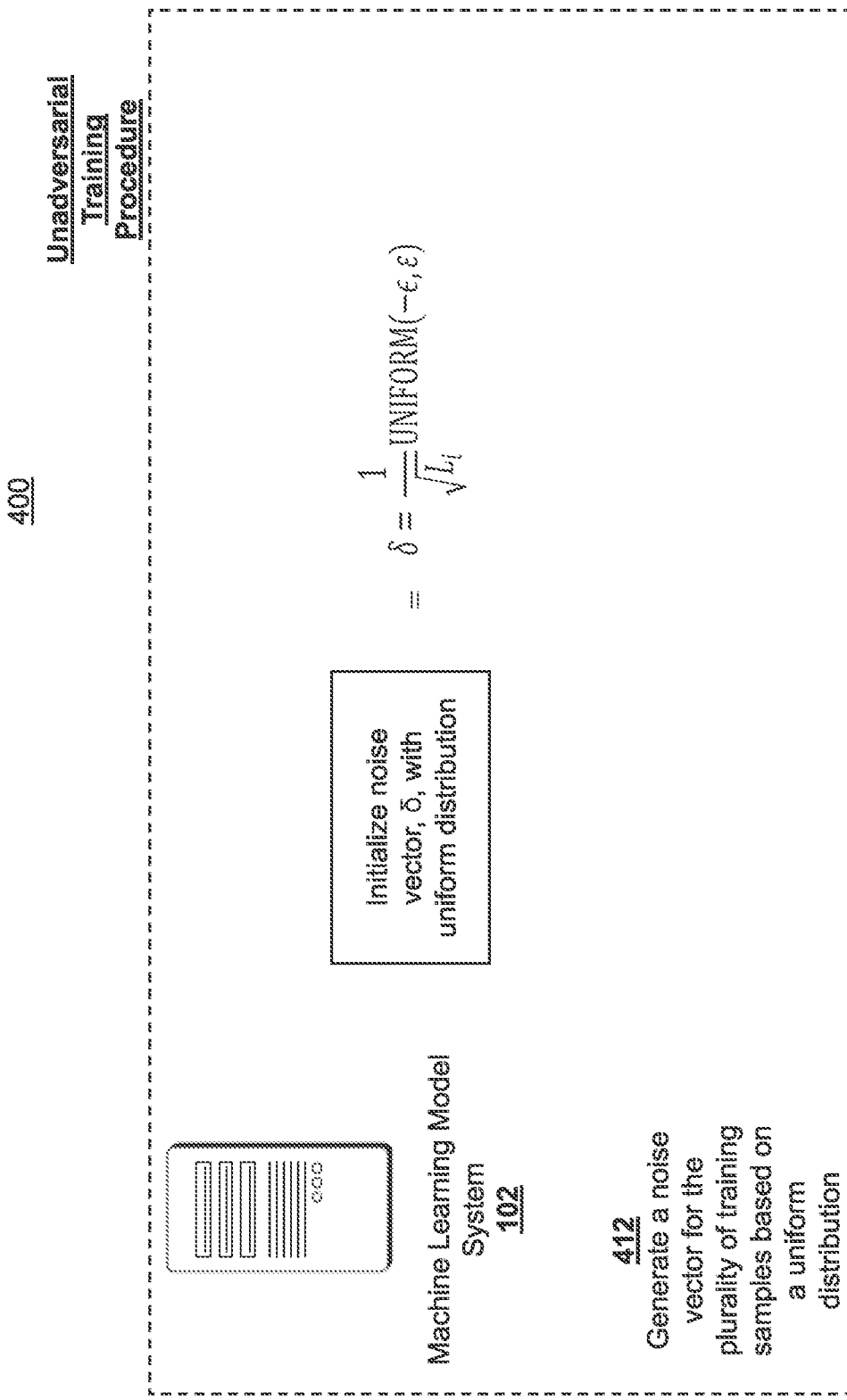

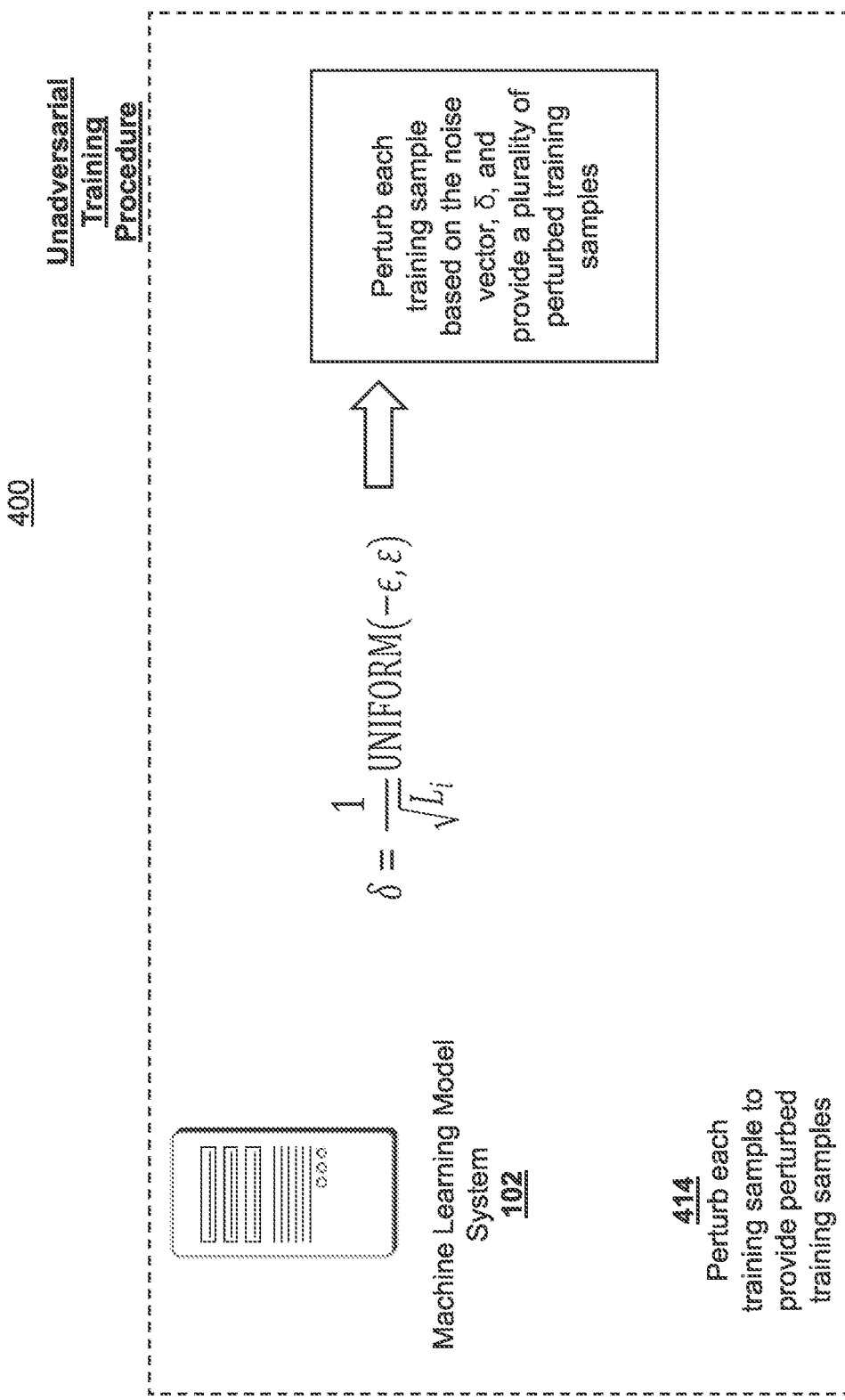

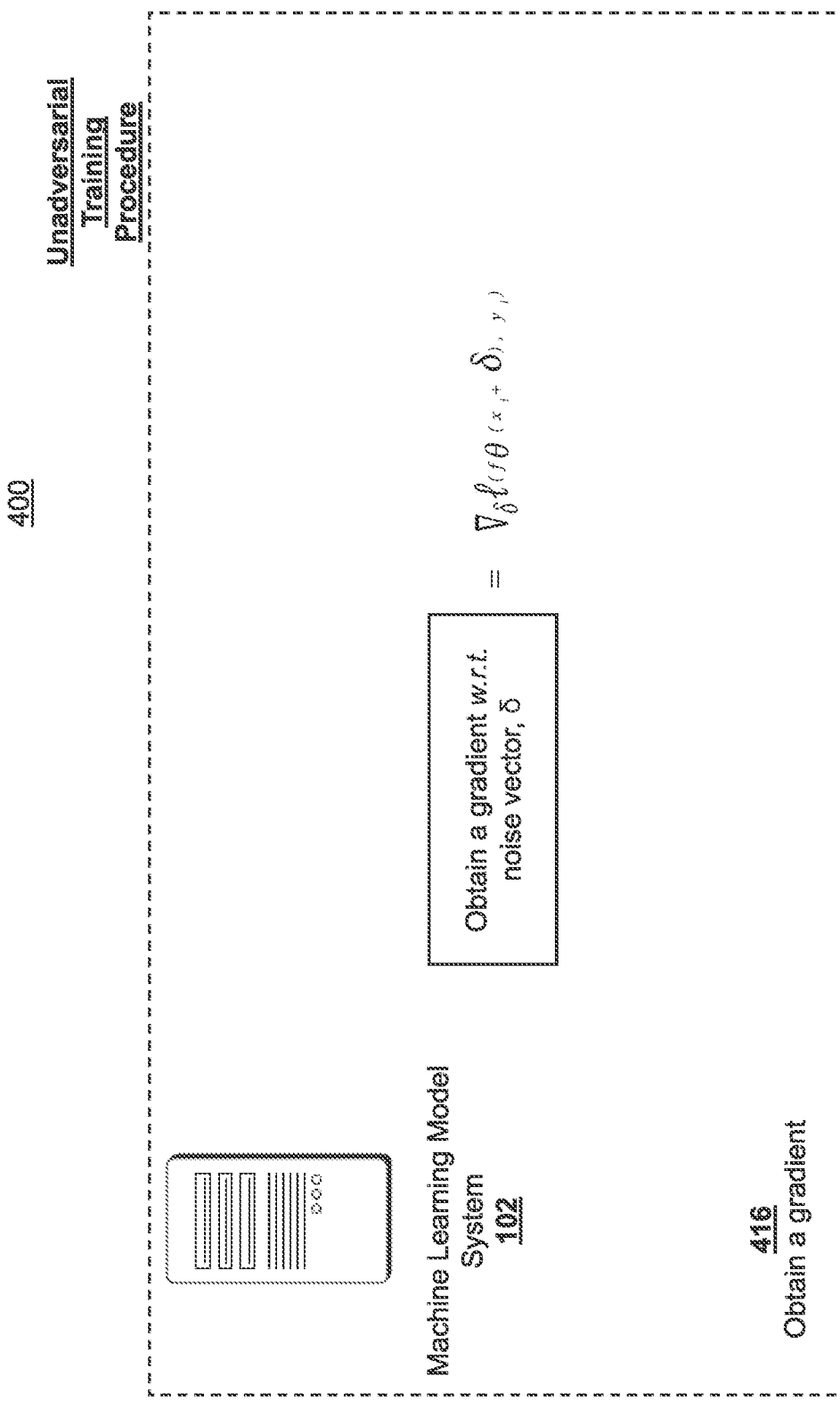

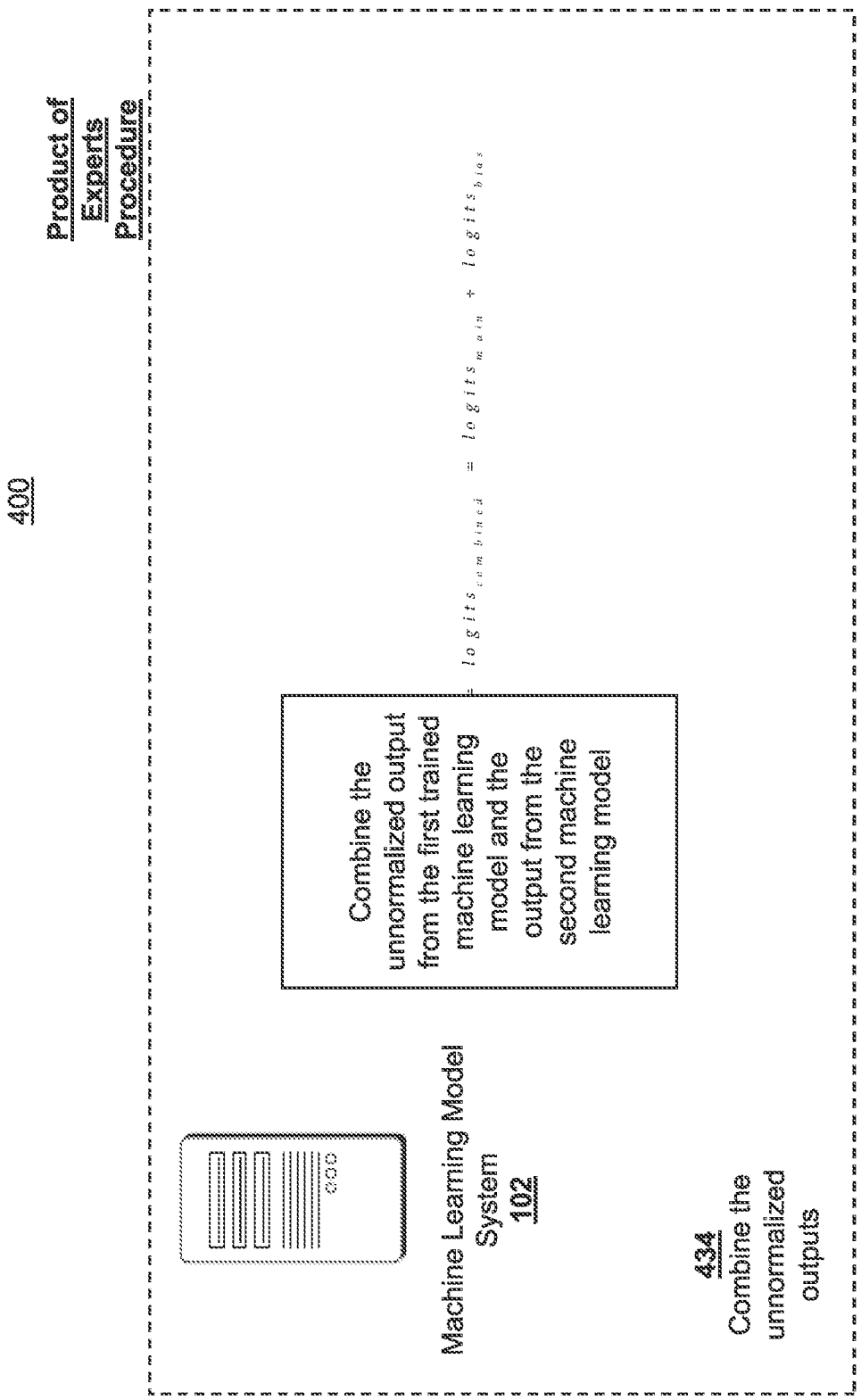

SYSTEM, METHOD, AND COMPUTER PROGRAM PRODUCT FOR REDUCING DATASET BIASES IN NATURAL LANGUAGE INFERENCE TASKS USING UNADVERSARIAL TRAINING

CROSS REFERENCE TO RELATED APPLICATIONS

This application is the United States national phase of International Application No. PCT/US23/21709 filed on May 10, 2023, and claims the benefit of U.S. Provisional Patent Application No. 63/340,132, filed on May 10, 2022, the disclosures of which are hereby incorporated by reference in their entireties.

BACKGROUND

1. Technical Field

The present disclosure relates generally to machine learning models and in some non-limiting embodiments or aspects, systems, methods, and computer program products for reducing dataset biases in natural language inference tasks using unadversarial training.

2. Technical Considerations

Machine learning may refer to a field of computer science that uses statistical techniques to provide a computer system with the ability to learn (e.g., progressively improve performance of) a task with a given dataset, without the computer system being programmed to perform the task. In some instances, a machine learning model may be created for a specific dataset so that the machine learning model may perform a task (e.g., a classification task) with regard to the dataset.

Machine learning bias (e.g., algorithm bias, artificial intelligence (AI) bias, etc.) may refer to a phenomenon that occurs when a machine learning algorithm produces results that are systemically prejudiced due to erroneous assumptions in the process of generating machine learning models. Machine learning bias may stem from problems introduced by an individual who designed (e.g., built, trained, validated, etc.) a machine learning system that uses a machine learning model. In some instances, the individual could either create an algorithm that reflects unintended cognitive biases and/or real-life prejudices, or in some instances, machine learning bias could be introduced because the individual uses incomplete, faulty, and/or prejudicial data sets to train and/or validate the machine learning systems.

In some instances, a machine learning model, such as a natural language processing model, may be trained to perform a task (e.g., a natural language inference task) using a dataset. However, a dataset used to train such a machine learning model may contain dataset biases (e.g., a machine learning bias that is present in a dataset), which may be detrimental during training of a machine learning model. For example, dataset biases may cause the model to learn from spurious correlations (e.g., false correlations, incorrect correlations, unimportant correlations, etc.) between instances of the dataset, thereby preventing a machine learning model from correctly learning a task. This may make it difficult for a machine learning model to generalize outside of the dataset that was used to train the model, which lowers the accuracy of the machine learning model.

SUMMARY

Accordingly, provided are improved systems, devices, products, apparatus, and/or methods for mitigating dataset biases while generating machine learning models for classification tasks using unadversarial training.

According to some non-limiting embodiments or aspects, provided is a system for generating machine learning models for classification tasks using unadversarial training. The system includes at least one processor programmed or configured to perform an unadversarial training procedure to train a machine learning model to provide a trained machine learning model, wherein, when performing the unadversarial training procedure. The at least one processor is further programmed and/or configured to receive a training dataset comprising a plurality of training samples. The at least one processor is further programmed and/or configured to generate a noise vector for the plurality of training samples based on a uniform distribution. The at least one processor is further programmed and/or configured to perturb each training sample of the plurality of training samples based on the noise vector to provide a plurality of perturbed training samples. The at least one processor is further programmed and/or configured to obtain a gradient between a first output of the machine learning model that results from inputting each training sample of the plurality of training samples and a second output of the machine learning model that results from inputting each perturbed training sample of the plurality of perturbed training samples. The at least one processor is further programmed and/or configured to generate an updated noise vector based on the gradient. The at least one processor is further programmed and/or configured to perturb each training sample of the plurality of training samples based on the updated noise vector to provide a second plurality of perturbed training samples. The at least one processor is further programmed and/or configured to update a model weight of the machine learning model based on the second plurality of perturbed training samples to provide the trained machine learning model.

In some non-limiting embodiments or aspects, when generating the noise vector for the plurality of training samples, the at least one processor is programmed and/or configured to initialize the noise vector with a first uniform distribution. In some non-limiting embodiments or aspects, when initializing the noise vector, the at least one processor is programmed and/or configured to multiply the first uniform distribution by a predefined radius to provide a second uniform distribution. In some non-limiting embodiments or aspects, when initializing the noise vector, the at least one processor is programmed and/or configured to divide the second uniform distribution by a square root of an input embedding size of the machine learning model to provide an initial value of the noise vector.

In some non-limiting embodiments or aspects, when generating the updated noise vector, the at least one processor is programmed and/or configured to multiply the gradient by a step size.

In some non-limiting embodiments or aspects, the at least one processor is programmed and/or configured to restrict a value of the updated noise vector based on a predefined radius to provide a second updated noise vector. In some non-limiting embodiments or aspects, when perturbing each training sample of the plurality of training samples based on the updated noise vector to provide the second plurality of perturbed training samples, the at least one processor is programmed and/or configured to perturb each training sample of the plurality of training samples based on the second updated noise vector to provide the second plurality of perturbed training samples.

In some non-limiting embodiments or aspects, the trained machine learning model is a first trained machine learning model. In some non-limiting embodiments or aspects, the processor is programmed and/or configured to train a second machine learning model using a Product of Experts (POE) procedure based on the first trained machine learning model.

In some non-limiting embodiments or aspects, when training the second machine learning model using the POE procedure, the at least one processor is further programmed and/or configured to generate an unnormalized output from the first trained machine learning model based on the plurality of training samples of the training dataset. In some non-limiting embodiments or aspects, when training the second machine learning model using the POE procedure, the at least one processor is further programmed and/or configured to generate an unnormalized output from the second machine learning model based on the plurality of training samples of the training dataset. In some non-limiting embodiments or aspects, when training the second machine learning model using the POE procedure, the at least one processor is further programmed and/or configured to combine the unnormalized output from the first trained machine learning model and the unnormalized output from the second machine learning model to provide a combined unnormalized output. In some non-limiting embodiments or aspects, when training the second machine learning model using the POE procedure, the at least one processor is further programmed and/or configured to update a model weight of the second machine learning model based on the combined unnormalized output to provide the second trained machine learning model.

In some non-limiting embodiments or aspects, when generating the unnormalized output from the first trained machine learning model based on the plurality of training samples of the training dataset, the at least one processor is programmed and/or configured to generate an output of the first trained machine learning model using a first logits function based on the plurality of training samples of the training dataset. In some non-limiting embodiments or aspects, when generating the unnormalized output from the second machine learning model based on the plurality of training samples of the training dataset, the at least one processor is programmed and/or configured to generate an output of the second trained machine learning model using a second logits function based on the plurality of training samples of the training dataset. In some non-limiting embodiments or aspects, when combining the unnormalized output from the first trained machine learning model and the unnormalized output from the second machine learning model to provide a combined unnormalized output, the at least one processor is programmed and/or configured to combine the output of the first trained machine learning model using the first logits function based on the plurality of training samples of the training dataset and the output of the second machine learning model using the second logits function based on the plurality of training samples of the training dataset to provide a combined output. In some non-limiting embodiments or aspects, when updating the model weight of the second machine learning model based on the combined unnormalized output to provide the second trained machine learning model, the at least one processor is further programmed or configured to update the model weight of the second machine learning model based on the combined output to provide the second trained machine learning model.

According to come non-limiting embodiments or aspects, provided is a computer-implemented method for generating machine learning models for classification tasks using unadversarial training. The method includes performing, by at least one processor, an unadversarial training procedure to train a machine learning model to provide a trained machine learning model. In some non-limiting embodiments or aspects, the method also includes receiving a training dataset comprising a plurality of training samples. The method further includes generating a noise vector for the plurality of training samples based on a uniform distribution. The method further includes perturbing each training sample of the plurality of training samples based on the noise vector to provide a plurality of perturbed training samples. The method further includes obtaining a gradient between a first output of the machine learning model that results from inputting each training sample of the plurality of training samples and a second output of the machine learning model that results from inputting each perturbed training sample of the plurality of perturbed training samples. The method further includes generating an updated noise vector based on the gradient. The method further includes perturbing each training sample of the plurality of training samples based on the updated noise vector to provide a second plurality of perturbed training samples. The method further includes updating a model weight of the machine learning model based on the second plurality of perturbed training samples to provide the trained machine learning model.

In some non-limiting embodiments or aspects, wherein when generating the noise vector for the plurality of training samples, the method further includes initializing the noise vector with a uniform distribution. In some non-limiting embodiments or aspects, wherein when initializing the noise vector, the method further includes multiplying the first uniform distribution by a predefined radius to provide a second uniform distribution; and dividing the second uniform distribution by a square root of an input embedding size of the machine learning model to provide an initial value of the noise vector.

In some non-limiting embodiments or aspects, when generating the updated noise vector, the method further includes multiplying the gradient by a step size. In some non-limiting embodiments or aspects, the method further includes restricting a value of the updated noise vector based on a predefined radius to provide a second updated noise vector; wherein when perturbing each training sample of the plurality of training samples based on the updated noise vector to provide the second plurality of perturbed training samples the method further includes: perturbing each training sample of the plurality of training samples based on the second updated noise vector to provide the second plurality of perturbed training samples.

In some non-limiting embodiments or aspects, the trained machine learning model is a first trained machine learning model, and the method further includes training a second machine learning model using a POE procedure based on the first trained machine learning model.

In some non-limiting embodiments or aspects, wherein when training the second machine learning model using the POE procedure, the method further includes generating an unnormalized output from the first trained machine learning model based on the plurality of training samples of the training dataset; generating an unnormalized output from the second machine learning model based on the plurality of training samples of the training dataset; combining the unnormalized output from the first trained machine learning model and the unnormalized output from the second machine learning model to provide a combined unnormalized output; and updating a model weight of the second machine learning model based on the combined unnormalized output to provide the second trained machine learning model.

In some non-limiting embodiments or aspects, wherein when generating the unnormalized output from the first trained machine learning model based on the plurality of training samples of the training dataset, the method further includes generating an output of the first trained machine learning model using a first logits function based on the plurality of training samples of the training dataset.

In some non-limiting embodiments or aspects, wherein when generating the unnormalized output from the second machine learning model based on the plurality of training samples of the training dataset, the method further includes generating an output of the second machine learning model using a second logits function based on the plurality of training samples of the training dataset.

In some non-limiting embodiments or aspects, wherein when combining the unnormalized output from the first trained machine learning model and the unnormalized output from the second machine learning model to provide a combined unnormalized output, the method further includes combining the output of the first trained machine learning model using the first logits function based on the plurality of training samples of the training dataset and the output of the second machine learning model using the second logits function based on the plurality of training samples of the training dataset to provide a combined output.

In some non-limiting embodiments or aspects, wherein when updating the model weight of the second machine learning model based on the combined unnormalized output to provide the second trained machine learning model, the method further includes updating the model weight of the second machine learning model based on the combined output to provide the second trained machine learning model.

According to non-limiting embodiments or aspects, provided is a computer program product for generating machine learning models for classification tasks using unadversarial training, the computer program product comprising at least one non-transitory computer-readable medium including one or more instructions that, when executed by at least one processor, cause the at least one processor to perform an unadversarial training procedure to train a machine learning model to provide a trained machine learning model. In some non-limiting embodiments or aspects, when performing the unadversarial training procedure, the one or more instructions further cause the at least one processor to receive a training dataset comprising a plurality of training samples; generate a noise vector for the plurality of training samples based on a uniform distribution. In some non-limiting embodiments or aspects, when performing the unadversarial training procedure, the one or more instructions further cause the at least one processor to perturb each training sample of the plurality of training samples based on the noise vector to provide a plurality of perturbed training samples. In some non-limiting embodiments or aspects, when performing the unadversarial training procedure, the one or more instructions further cause the at least one processor to obtain a gradient between a first output of the machine learning model that results from inputting each training sample of the plurality of training samples and a second output of the machine learning model that results from inputting each perturbed training sample of the plurality of perturbed training samples. In some non-limiting embodiments or aspects, when performing the unadversarial training procedure, the one or more instructions further cause the at least one processor to generate an updated noise vector based on the gradient; and perturb each training sample of the plurality of training samples based on the updated noise vector to provide a second plurality of perturbed training samples. In some non-limiting embodiments or aspects, when performing the unadversarial training procedure, the one or more instructions further cause the at least one processor to update a model weight of the machine learning model based on the second plurality of perturbed training samples to provide the trained machine learning model.

In some non-limiting embodiments or aspects, wherein, when generating the noise vector for the plurality of training samples, the one or more instructions further cause the at least one processor to: initialize the noise vector with a uniform distribution, wherein when initializing the noise vector, the one or more instructions cause the at least one processor to: multiply the first uniform distribution by a predefined radius to provide a second uniform distribution; and divide the second uniform distribution by a square root of an input embedding size of the machine learning model to provide an initial value of the noise vector.

In some non-limiting embodiments or aspects, wherein, when generating the updated noise vector, the one or more instructions further cause the at least one processor to multiply the gradient by a step size.

In some non-limiting embodiments or aspects, wherein, the one or more instructions further cause the at least one processor to: restrict a value of the updated noise vector based on a predefined radius to provide a second updated noise vector; and wherein, when perturbing each training sample of the plurality of training samples based on the updated noise vector to provide the second plurality of perturbed training samples, the one or more instructions cause the at least one processor to: perturb each training sample of the plurality of training samples based on the second updated noise vector to provide the second plurality of perturbed training samples.

In some non-limiting embodiments or aspects, the trained machine learning model is a first trained machine learning model, and the one or more instructions further cause the at least one processor to: train a second machine learning model using a POE procedure based on the first trained machine learning model. In some non-limiting embodiments or aspects, wherein, when training the second machine learning model using the POE procedure, the one or more instructions further cause the at least one processor to: generate an unnormalized output from the first trained machine learning model based on the plurality of training samples of the training dataset; generate an unnormalized output from the second machine learning model based on the plurality of training samples of the training dataset; combine the unnormalized output from the first trained machine learning model and the unnormalized output from the second machine learning model to provide a combined unnormalized output; and update a model weight of the second machine learning model based on the combined unnormalized output to provide the second trained machine learning model.

In some non-limiting embodiments or aspects, wherein, when generating the unnormalized output from the first trained machine learning model based on the plurality of training samples of the training dataset, the one or more instructions further cause the at least one processor to: generate an output of the first trained machine learning model using a first logits function based on the plurality of training samples of the training dataset. In some non-limiting embodiments or aspects, wherein, when generating the unnormalized output from the second machine learning model based on the plurality of training samples of the training dataset, the one or more instructions further cause the at least one to: generate an output of the second machine learning model using a second logits function based on the plurality of training samples of the training dataset. In some non-limiting embodiments or aspects, wherein, when combining the unnormalized output from the first trained machine learning model and the unnormalized output from the second machine learning model to provide a combined unnormalized output, the one or more instructions further cause the at least one processor to: combine the output of the first trained machine learning model using the first logits function based on the plurality of training samples of the training dataset and the output of the second machine learning model using the second logits function based on the plurality of training samples of the training dataset to provide a combined output. In some non-limiting embodiments or aspects, wherein, when updating the model weight of the second machine learning model based on the combined unnormalized output to provide the second trained machine learning model, the one or more instructions further cause the at least one processor to: update the model weight of the second machine learning model based on the combined output to provide the second trained machine learning model.

Further non-limiting embodiments or aspects are set forth in the following numbered clauses:

Clause 1: A system comprising: at least one processor programmed or configured to: perform an unadversarial training procedure to train a machine learning model to provide a trained machine learning model, wherein, when performing the unadversarial training procedure, the at least one processor is programmed or configured to: receive a training dataset comprising a plurality of training samples; generate a noise vector for the plurality of training samples based on a uniform distribution; perturb each training sample of the plurality of training samples based on the noise vector to provide a plurality of perturbed training samples; obtain a gradient between a first output of the machine learning model that results from inputting each training sample of the plurality of training samples and a second output of the machine learning model that results from inputting each perturbed training sample of the plurality of perturbed training samples; generate an updated noise vector based on the gradient; perturb each training sample of the plurality of training samples based on the updated noise vector to provide a second plurality of perturbed training samples; and update a model weight of the machine learning model based on the second plurality of perturbed training samples to provide the trained machine learning model.

Clause 2: The system of clause 1, wherein, when generating the noise vector for the plurality of training samples, the at least one processor is programmed or configured to: initialize the noise vector with a uniform distribution, wherein, when initializing the noise vector, the at least one processor is programmed or configured to: multiply the first uniform distribution by a predefined radius to provide a second uniform distribution; and divide the second uniform distribution by a square root of an input embedding size of the machine learning model to provide an initial value of the noise vector.

Clause 3: The system of clause 1 or 2, wherein, when generating the updated noise vector, the at least one processor is programmed or configured to: multiply the gradient by a step size.

Clause 4: The system of any of clauses 1-3, wherein, the at least one processor is further programmed or configured to: restrict a value of the updated noise vector based on a predefined radius to provide a second updated noise vector; and wherein, when perturbing each training sample of the plurality of training samples based on the updated noise vector to provide the second plurality of perturbed training samples, the at least one processor is programmed or configured to: perturb each training sample of the plurality of training samples based on the second updated noise vector to provide the second plurality of perturbed training samples.

Clause 5: The system of any of clauses 1-4, wherein, the trained machine learning model is a first trained machine learning model, and wherein the at least one processor is further programmed or configured to: train a second machine learning model using a Product of Experts (POE) procedure based on the first trained machine learning model.

Clause 6: The system of any of clauses 1-5, wherein, when training the second machine learning model using the POE procedure, the at least one processor is further programmed or configured to: generate an unnormalized output from the first trained machine learning model based on the plurality of training samples of the training dataset; generate an unnormalized output from the second machine learning model based on the plurality of training samples of the training dataset; combine the unnormalized output from the first trained machine learning model and the unnormalized output from the second machine learning model to provide a combined unnormalized output; and update a model weight of the second machine learning model based on the combined unnormalized output to provide the second trained machine learning model.

Clause 7: The system of any of clauses 1-6, wherein, when generating the unnormalized output from the first trained machine learning model based on the plurality of training samples of the training dataset, the at least one processor is programmed or configured to: generate an output of the first trained machine learning model using a first logits function based on the plurality of training samples of the training dataset; wherein, when generating the unnormalized output from the second machine learning model based on the plurality of training samples of the training dataset, the at least one processor is programmed or configured to: generate an output of the second machine learning model using a second logits function based on the plurality of training samples of the training dataset; wherein, when combining the unnormalized output from the first trained machine learning model and the unnormalized output from the second machine learning model to provide the combined unnormalized output, the at least one processor is programmed or configured to: combine the output of the first trained machine learning model using the first logits function based on the plurality of training samples of the training dataset and the output of the second machine learning model using the second logits function based on the plurality of training samples of the training dataset to provide a combined output; and wherein, when updating the model weight of the second machine learning model based on the combined unnormalized output to provide the second trained machine learning model, the at least one processor is further programmed or configured to: update the model weight of the second machine learning model based on the combined output to provide the second trained machine learning model.

Clause 8: A computer-implemented method comprising: performing, by at least one processor, an unadversarial training procedure to train a machine learning model to provide a trained machine learning model, wherein performing the unadversarial training procedure, comprises: receiving a training dataset comprising a plurality of training samples; generating a noise vector for the plurality of training samples based on a uniform distribution; perturbing each training sample of the plurality of training samples based on the noise vector to provide a plurality of perturbed training samples; obtaining a gradient between a first output of the machine learning model that results from inputting each training sample of the plurality of training samples and a second output of the machine learning model that results from inputting each perturbed training sample of the plurality of perturbed training samples; generating an updated noise vector based on the gradient; perturbing each training sample of the plurality of training samples based on the updated noise vector to provide a second plurality of perturbed training samples; and updating a model weight of the machine learning model based on the second plurality of perturbed training samples to provide the trained machine learning model.

Clause 9: The computer-implemented method of clause 8, wherein generating the noise vector for the plurality of training samples comprises: initializing the noise vector with a uniform distribution, wherein initializing the noise vector comprises: multiplying the first uniform distribution by a predefined radius to provide a second uniform distribution; and dividing the second uniform distribution by a square root of an input embedding size of the machine learning model to provide an initial value of the noise vector.

Clause 10: The computer-implemented method of clause 8 or 9, wherein generating the updated noise vector comprises: multiplying the gradient by a step size.

Clause 11: The computer-implemented method of any of clauses 8-10, further comprising: restricting a value of the updated noise vector based on a predefined radius to provide a second updated noise vector; wherein perturbing each training sample of the plurality of training samples based on the updated noise vector to provide the second plurality of perturbed training samples comprises: perturbing each training sample of the plurality of training samples based on the second updated noise vector to provide the second plurality of perturbed training samples.

Clause 12: The computer-implemented method of any of clauses 8-11, wherein the trained machine learning model is a first trained machine learning model, and wherein the method further comprises: training a second machine learning model using a Product of Experts (POE) procedure based on the first trained machine learning model.

Clause 13: The computer-implemented method of any of clauses 8-12, wherein training the second machine learning model using the POE procedure comprises: generating an unnormalized output from the first trained machine learning model based on the plurality of training samples of the training dataset; generating an unnormalized output from the second machine learning model based on the plurality of training samples of the training dataset; combining the unnormalized output from the first trained machine learning model and the unnormalized output from the second machine learning model to provide a combined unnormalized output; and updating a model weight of the second machine learning model based on the combined unnormalized output to provide the second trained machine learning model.

Clause 14: The computer-implemented method of any of clauses 8-13, wherein generating the unnormalized output from the first trained machine learning model based on the plurality of training samples of the training dataset comprises: generating an output of the first trained machine learning model using a first logits function based on the plurality of training samples of the training dataset; wherein generating the unnormalized output from the second machine learning model based on the plurality of training samples of the training dataset comprises: generating an output of the second trained machine learning model using a second logits function based on the plurality of training samples of the training dataset; wherein combining the unnormalized output from the first trained machine learning model and the unnormalized output from the second machine learning model to provide the combined unnormalized output comprises: combining the output of the first trained machine learning model using the first logits function based on the plurality of training samples of the training dataset and the output of the second trained machine learning model using the second logits function based on the plurality of training samples of the training dataset to provide a combined output; and wherein updating the model weight of the second machine learning model based on the combined unnormalized output to provide the second trained machine learning model comprises: updating the model weight of the second machine learning model based on the combined output to provide the second trained machine learning model.

Clause 15: A computer program product comprising at least one non-transitory computer-readable medium including one or more instructions that, when executed by at least one processor, cause the at least one processor to: perform an unadversarial training procedure to train a machine learning model to provide a trained machine learning model, wherein, when performing the unadversarial training procedure, the one or more instructions cause the at least one processor to: receive a training dataset comprising a plurality of training samples; generate a noise vector for the plurality of training samples based on a uniform distribution; perturb each training sample of the plurality of training samples based on the noise vector to provide a plurality of perturbed training samples; obtain a gradient between a first output of the machine learning model that results from inputting each training sample of the plurality of training samples and a second output of the machine learning model that results from inputting each perturbed training sample of the plurality of perturbed training samples; generate an updated noise vector based on the gradient; and perturb each training sample of the plurality of training samples based on the updated noise vector to provide a second plurality of perturbed training samples; and update a model weight of the machine learning model based on the second plurality of perturbed training samples to provide the trained machine learning model.

Clause 16: The computer program product of clause 15, wherein, when generating the noise vector for the plurality of training samples, the one or more instructions cause the at least one processor to: initialize the noise vector with a uniform distribution, wherein when initializing the noise vector, the one or more instructions cause the at least one processor to: multiply the first uniform distribution by a predefined radius to provide a second uniform distribution; and divide the second uniform distribution by a square root of an input embedding size of the machine learning model to provide an initial value of the noise vector.

Clause 17: The computer program product of clause 15 or 16, wherein, when generating the updated noise vector, the one or more instructions cause the at least one processor to: multiply the gradient by a step size.

Clause 18: The computer program product of any of clauses 15-17, wherein, the one or more instructions further cause the at least one processor to: restrict a value of the updated noise vector based on a predefined radius to provide a second updated noise vector; and wherein, when perturbing each training sample of the plurality of training samples based on the updated noise vector to provide the second plurality of perturbed training samples, the one or more instructions cause the at least one processor to: perturb each training sample of the plurality of training samples based on the second updated noise vector to provide the second plurality of perturbed training samples.

Clause 19: The computer program product of any of clauses 15-18, wherein the trained machine learning model is a first trained machine learning model, and wherein the one or more instructions cause the at least one processor to: train a second machine learning model using a Product of Experts (POE) procedure based on the first trained machine learning model; wherein, when training the second machine learning model using the POE procedure, the one or more instructions cause the at least one processor to: generate an unnormalized output from the first trained machine learning model based on the plurality of training samples of the training dataset; generate an unnormalized output from the second machine learning model based on the plurality of training samples of the training dataset; combine the unnormalized output from the first trained machine learning model and the unnormalized output from the second machine learning model to provide a combined unnormalized output; and update a model weight of the second machine learning model based on the combined unnormalized output to provide the second trained machine learning model.

Clause 20: The computer program product of any of clauses 15-19, wherein, when generating the unnormalized output from the first trained machine learning model based on the plurality of training samples of the training dataset, the one or more instructions cause the at least one processor to: generate an output of the first trained machine learning model using a first logits function based on the plurality of training samples of the training dataset; wherein, when generating the unnormalized output from the second machine learning model based on the plurality of training samples of the training dataset, the one or more instructions cause the at least one to: generate an output of the second trained machine learning model using a second logits function based on the plurality of training samples of the training dataset; wherein, when combining the unnormalized output from the first trained machine learning model and the unnormalized output from the second machine learning model to provide the combined unnormalized output, the one or more instructions cause the at least one processor to: combine the output of the first trained machine learning model using the first logits function based on the plurality of training samples of the training dataset and the output of the second trained machine learning model using the second logits function based on the plurality of training samples of the training dataset to provide a combined output; and wherein, when updating the model weight of the second machine learning model based on the combined unnormalized output to provide the second trained machine learning model, the one or more instructions cause the at least one processor to: update the model weight of the second machine learning model based on the combined output to provide the second trained machine learning model.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and the claims, the singular form of "a," "an," and "the" include plural referents unless the context clearly dictates otherwise.

BRIEF DESCRIPTION OF THE DRAWINGS

Additional advantages and details of the present disclosure are explained in greater detail below with reference to the exemplary embodiments that are illustrated in the accompanying schematic figures, in which.

DETAILED DESCRIPTION

Figure 1:
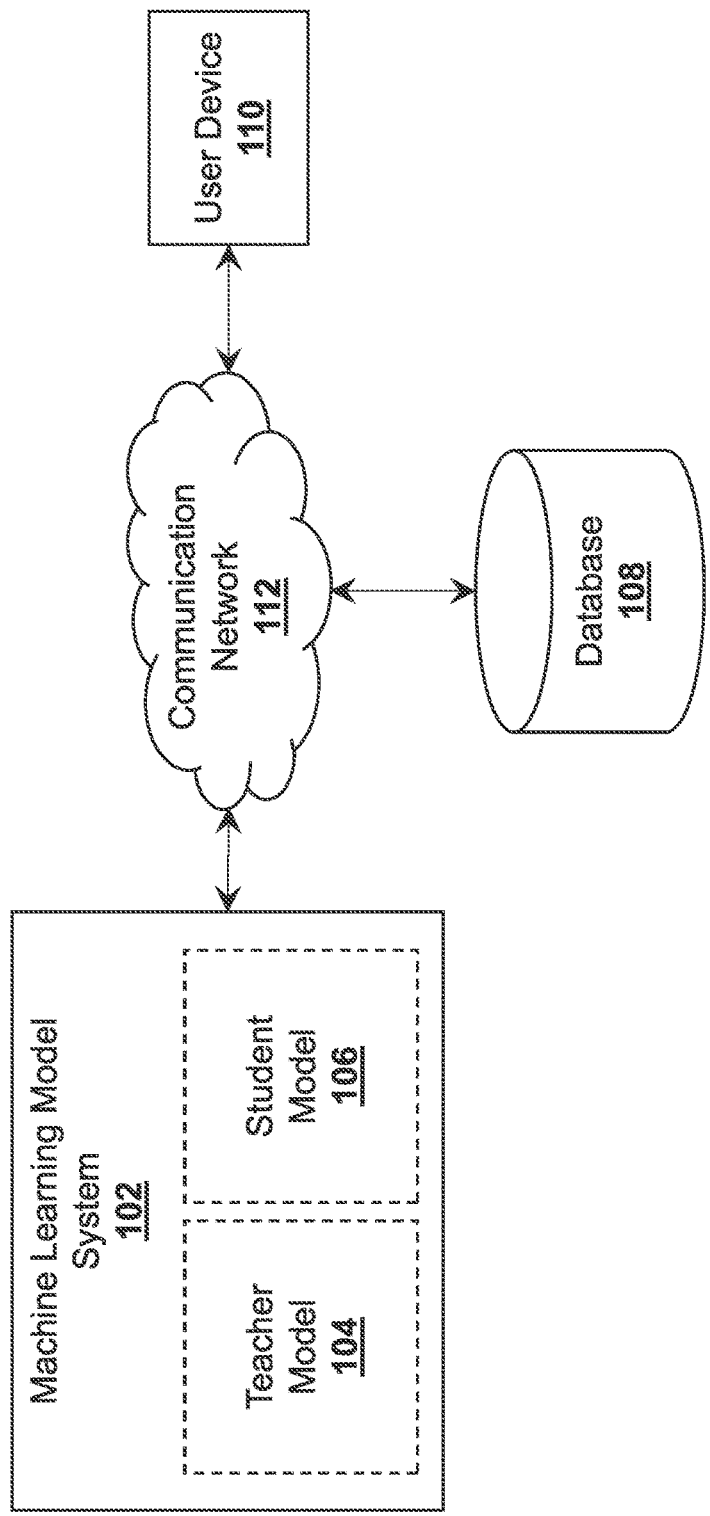
FIG. 1 is a diagram of a non-limiting embodiment or aspect of an environment in which systems, devices, products, apparatus, and/or methods, described herein, may be implemented according to the principles of the present disclosure.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects of the embodiments disclosed herein are not to be considered as limiting unless otherwise indicated.

Some non-limiting embodiments or aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

No aspect, component, element, structure, act, step, function, instruction, and/or the like used herein should be construed as critical or essential unless explicitly described as such. In addition, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise. In addition, reference to an action being "based on" a condition may refer to the action being "in response to" the condition. For example, the phrases "based on" and "in response to" may, in some non-limiting embodiments or aspects, refer to a condition for automatically triggering an action (e.g., a specific operation of an electronic device, such as a computing device, a processor, and/or the like).

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some non-limiting embodiments or aspects, a message may refer to a network packet (e.g., a data packet and/or the like) that includes data.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa®, MasterCard®, American Express®, or any other entity that processes transactions. As used herein, the term "transaction service provider system" may refer to one or more computer systems operated by or on behalf of a transaction service provider, such as a transaction service provider system executing one or more software applications. A transaction service provider system may include one or more processors and, in some non-limiting embodiments or aspects, may be operated by or on behalf of a transaction service provider.

As used herein, the terms "client" and "client device" may refer to one or more computing devices, such as processors, storage devices, and/or similar computer components, that access a service made available by a server. In some non-limiting embodiments or aspects, a client device may include a computing device configured to communicate with one or more networks and/or facilitate transactions such as, but not limited to, one or more desktop computers, one or more portable computers (e.g., tablet computers), one or more mobile devices (e.g., cellular phones, smartphones, personal digital assistant, wearable devices, such as watches, glasses, lenses, and/or clothing, and/or the like), and/or other like devices. Moreover, the term "client" may also refer to an entity that owns, utilizes, and/or operates a client device for facilitating transactions with another entity.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, point-of-sale (POS) devices, mobile devices, etc.) directly or indirectly communicating in the network environment may constitute a "system."

As used herein, the term "system" may refer to one or more computing devices or combinations of computing devices (e.g., processors, servers, client devices, software applications, components of such, and/or the like). Reference to "a device," "a server," "a processor," and/or the like, as used herein, may refer to a previously-recited device, server, or processor that is recited as performing a previous step or function, a different device, server, or processor, and/or a combination of devices, servers, and/or processors. For example, as used in the specification and the claims, a first device, a first server, or a first processor that is recited as performing a first step or a first function may refer to the same or different device, server, or processor recited as performing a second step or a second function.

Provided are systems, methods, and computer program products for mitigating dataset biases while generating machine learning models for classification tasks. Non-limiting embodiments or aspects of the present disclosure may include a system that includes at least one processor programmed or configured to perform an unadversarial training procedure to train a machine learning model to provide a trained machine learning model, wherein when performing the unadversarial training procedure, the processor is programmed to: receive a training dataset comprising a plurality of training samples; generate a noise vector for the plurality of training samples based on a uniform distribution; perturb each training sample of the plurality of training samples based on the noise vector to provide a plurality of perturbed training samples; obtain a gradient between a first output of the machine learning model that results from inputting each training sample of the plurality of training samples and a second output of the machine learning model that results from inputting each perturbed training sample of the plurality of perturbed training samples; generate an updated noise vector based on the gradient; perturb each training sample of the plurality of training samples based on the updated noise vector to provide a second plurality of perturbed training samples; and update a model weight of the machine learning model based on the second plurality of perturbed training samples to provide the trained machine learning model.

In some non-limiting embodiments or aspects, when generating the noise vector for the plurality of training samples, the at least one processor is programmed or configured to: initialize the noise vector with a uniform distribution. In some non-limiting embodiments or aspects, when initializing the noise vector, the at least one processor is programmed or configured to: multiply the uniform distribution by a predefined radius to provide a second uniform distribution; and divide the second uniform distribution by a square root of an input embedding size of the machine learning model to provide an initial value of the noise vector.

In some non-limiting embodiments or aspects, when generating the updated noise vector, the at least one processor is programmed or configured to: multiply the gradient by a step size.

In some non-limiting embodiments or aspects, the at least one processor is further programmed or configured to: restrict a value of the updated noise vector based on a predefined radius to provide a second updated noise vector. In some non-limiting embodiments or aspects, when perturbing each training sample of the plurality of training samples based on the updated noise vector to provide the second plurality of perturbed training samples, the at least one processor is programmed or configured to: perturb each training sample of the plurality of training samples based on the second updated noise vector to provide the second plurality of perturbed training samples.

In some non-limiting embodiments or aspects, the trained machine learning model is a first trained machine learning model, and the at least one processor is further programmed or configured to: train a second machine learning model using a Product of Experts (POE) procedure based on the first trained machine learning model.

In some non-limiting embodiments or aspects, when training the second machine learning model using the POE procedure, the at least one processor is further programmed or configured to: generate an unnormalized output from the first trained machine learning model based on the plurality of training samples of the training dataset; generate an unnormalized output from the second machine learning model based on the plurality of training samples of the training dataset; combine the unnormalized output from the first trained machine learning model and the unnormalized output from the second machine learning model to provide a combined unnormalized output; and update a model weight of the second machine learning model based on the combined unnormalized output to provide the second trained machine learning model.

In some non-limiting embodiments or aspects, when generating the unnormalized output from the first trained machine learning model based on the plurality of training samples of the training dataset, the at least one processor is programmed or configured to: generate an output of the first trained machine learning model using a first logits function based on the plurality of training samples of the training dataset. In some non-limiting embodiments or aspects, when generating the unnormalized output from the second machine learning model based on the plurality of training samples of the training dataset, the at least one processor is programmed or configured to: generate an output of the second trained machine learning model using a second logits function based on the plurality of training samples of the training dataset. In some non-limiting embodiments or aspects, when combining the unnormalized output from the first trained machine learning model and the unnormalized output from the second machine learning model to provide a combined unnormalized output, the at least one processor is programmed or configured to: combine the output of the first trained machine learning model using the first logits function based on the plurality of training samples of the training dataset and the output of the second trained machine learning model using the second logits function based on the plurality of training samples of the training dataset to provide a combined output. In some non-limiting embodiments or aspects, when updating the model weight of the second machine learning model based on the combined unnormalized output to provide the second trained machine learning model, the at least one processor is further programmed or configured to: update the model weight of the second machine learning model based on the combined output to provide the second trained machine learning model.

In this way, non-limiting embodiments or aspects of the present disclosure generate a biased machine learning model using unadversarial training. By applying unadversarial training, the machine learning model may learn from the biases of the training dataset and exploit the biased features of the training dataset to make predictions. As compared to a machine learning model trained using adversarial training, a machine learning model trained using unadversarial training may be more dependent on dataset biases contained in a training dataset. Further, applying unadversarial training to a plurality of training samples of a training dataset may reinforce the correct behavior of the machine learning model and strengthen the characteristics that help the machine leaning model to make accurate predictions. Additionally, combining unadversarial training with the POE procedure may result in a more robust and accurate trained second machine learning model by improving the performance of a second trained machine learning model (e.g., a student model). Training the student model, using a POE procedure (e.g., using the first trained machine learning model as guidance to train the second machine learning model) may improve the second machine learning model by making the predictions of the second machine learning model more accurate.

Referring now to FIG. 1, shown is a diagram of an example environment 100 in which devices, systems, and/or methods, described herein, may be implemented. As shown in FIG. 1, environment 100 includes machine learning model system 102, database 108, user device 110, and communication network 112. Machine learning model system 102, database 108, and/or user device 110 may interconnect (e.g., establish a connection to communicate) via wired connections, wireless connections, or a combination of wired and wireless connections.

Machine learning model system 102 may include one or more devices configured to communicate with database 108 and/or user device 110 via communication network 112. For example, machine learning model system 102 may include a server, a group of servers, and/or other like devices. In some non-limiting embodiments or aspects, machine learning model system 102 may be associated with a transaction service provider system, as described herein.

In some non-limiting embodiments or aspects, machine learning model system 102 may include teacher model 104 and/or student model 106. In some non-limiting embodiments or aspects, teacher model 104 may include one or more machine learning models. In some non-limiting embodiments or aspects, teacher model 104 may include one or more machine learning models which may be trained and subsequently used to teach (e.g., train using transfer learning, knowledge distillation, and/or the like) student model 106 using various techniques, such as POE, debiased focal loss, example reweighting, and/or the like. The trained teacher model may be used to teach student model 106 to make the same predictions as the trained teacher model.

In some non-limiting embodiments or aspects, machine learning model system 102 may generate (e.g., train, validate, retrain, and/or the like), store, and/or implement (e.g., operate, provide inputs to and/or outputs from, and/or the like) one or more machine learning models. For example, machine learning model system 102 may generate, store, and/or implement teacher model 104 and/or student model 106. In some non-limiting embodiments or aspects, machine learning model system 102 may be in communication with a data storage device, which may be local or remote to machine learning model system 102. In some non-limiting embodiments or aspects, machine learning model system 102 may be capable of receiving information from, storing information in, transmitting information to, and/or searching information stored in database 108.

Database 108 may include one or more devices configured to communicate with machine learning model system 102 and/or user device 110 via communication network 112. For example, database 108 may include a computing device, such as a server, a group of servers, and/or other like devices. In some non-limiting embodiments or aspects, database 108 may be associated with a transaction service provider system as discussed herein.

User device 110 may include a computing device configured to communicate with machine learning model system 102 and/or database 108 via communication network 112. For example, user device 110 may include a computing device, such as a desktop computer, a portable computer (e.g., a tablet computer, a laptop computer, and/or the like), a mobile device (e.g., a cellular phone, a smartphone, a personal digital assistant, a wearable device, and/or the like), and/or other like devices. In some non-limiting embodiments or aspects, user device 110 may be associated with a user (e.g., an individual operating user device 110).

Communication network 112 may include one or more wired and/or wireless networks. For example, communication network 112 may include a cellular network (e.g., a long-term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN) and/or the like), a private network, an ad hoc network, an intranet, the Internet, a fiber optic-based network, a cloud computing network, and/or the like, and/or a combination of some or all of these or other types of networks.

The number and arrangement of devices and networks shown in FIG. 1 are provided as an example. There may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally or alternatively, a set of devices (e.g., one or more devices) of environment 100 may perform one or more functions described as being performed by another set of devices of environment 100.

Figure 2:
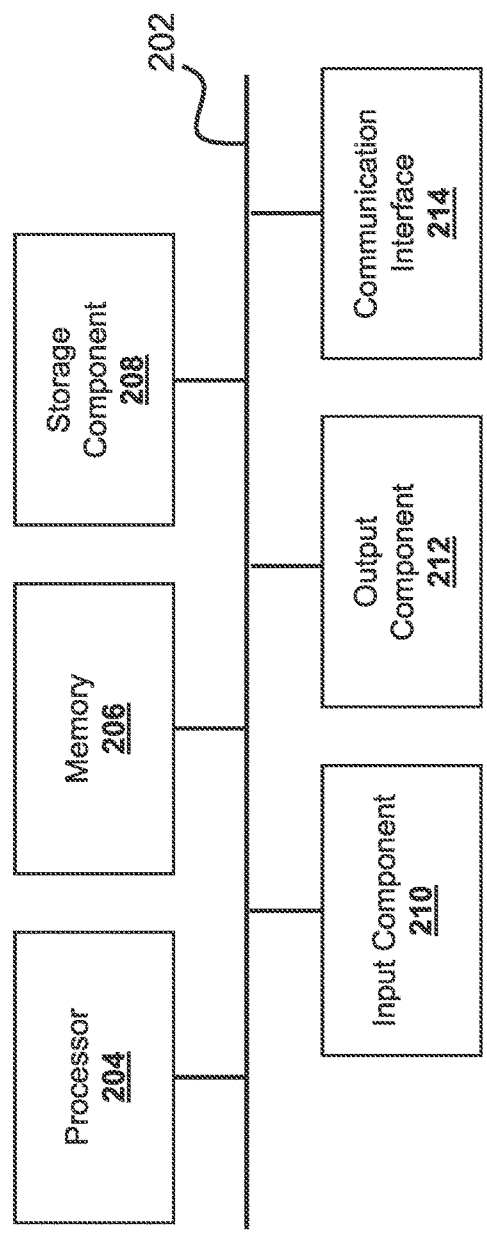
FIG. 2 is a diagram of a non-limiting embodiment or aspect of components of one or more devices of FIG. 1.

Referring now to FIG. 2, shown is a diagram of example components of a device 200. Device 200 may correspond to machine learning model system 102 (e.g., one or more devices of machine learning model system 102), database 108 (e.g., one or more devices of database 108), and/or user device 110. In some non-limiting embodiments or aspects, machine learning model system 102, database 108, and/or user device 110 may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments or aspects, processor 204 may be implemented in hardware, firmware, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read-only memory (ROM), and/or another type of dynamic or static storage memory (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, etc.). Additionally or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software. The term "configured to," as used herein, may refer to an arrangement of software, device(s), and/or hardware for performing and/or enabling one or more functions (e.g., actions, processes, steps of a process, and/or the like). For example, "a processor configured to" may refer to a processor that executes software instructions (e.g., program code) that cause the processor to perform one or more functions.

The number and arrangement of components shown in FIG. 2 are provided as an example. In some non-limiting embodiments or aspects, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
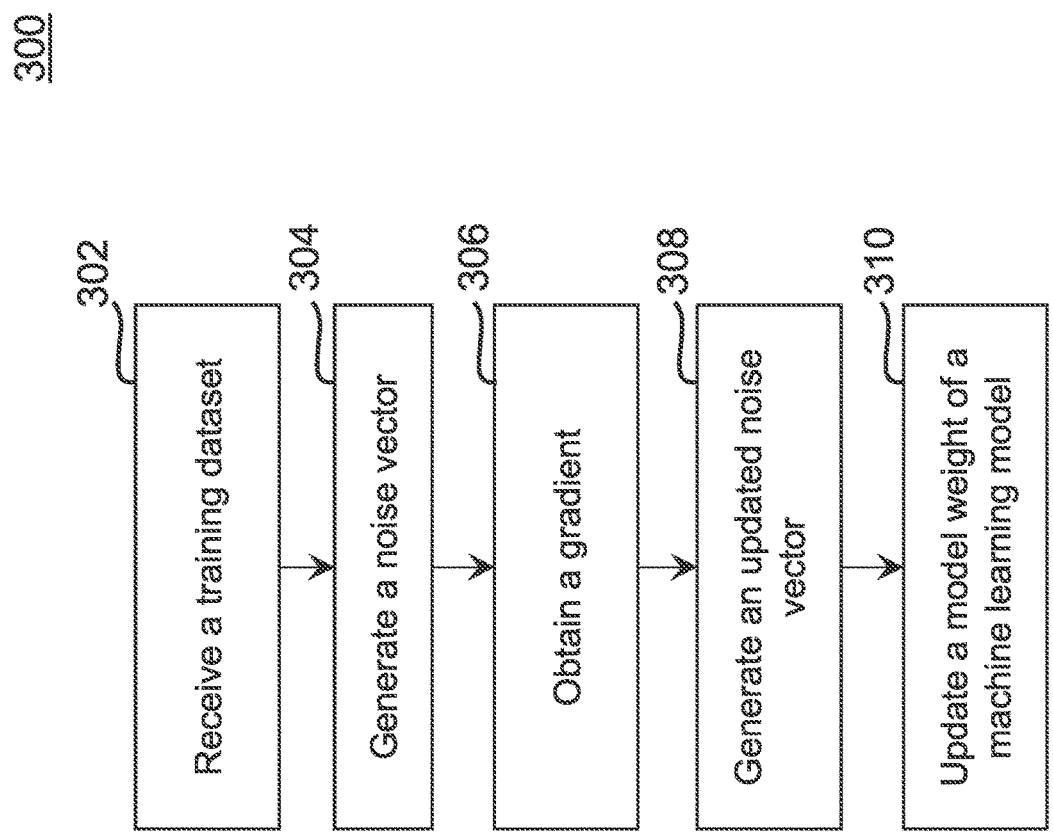
FIG. 3 is a flowchart of a non-limiting embodiment or aspect of a process for mitigating dataset biases while generating machine learning models for classification tasks.

Referring now to FIG. 3, shown is a flowchart of a non-limiting embodiment or aspect of a process 300 for mitigating dataset biases while generating machine learning models for classification tasks. In some non-limiting embodiments or aspects, one or more of the steps of process 300 may be performed (e.g., completely, partially, etc.) by machine learning model system 102 (e.g., one or more devices of machine learning model system 102). In some non-limiting embodiments or aspects, one or more of the steps of process 300 may be performed (e.g., completely, partially, etc.) by another device or a group of devices separate from or including machine learning model system 102 (e.g., one or more devices of machine learning model system 102), database 108 (e.g., one or more devices of database 108), and/or user device 110.

As shown in FIG. 3, at step 302, process 300 includes receiving a training dataset. For example, machine learning model system 102 may receive (e.g., from database 108) the training dataset for training one or more machine learning models. In some non-limiting embodiments or aspects, the training dataset may comprise dataset biases. In some non-limiting embodiments or aspects, the training dataset may comprise a plurality of training samples. In some non-limiting embodiments or aspects, each training sample of the plurality of the training samples of the training dataset may be labeled. In some non-limiting embodiments or aspects, the plurality of training samples may be a plurality of input embeddings (e.g., embedding vectors). In some non-limiting embodiments or aspects, the plurality of input embeddings may be word embeddings. In some non-limiting embodiments or aspects, the training dataset may be stored in a storage component and/or stored in database 108.

In some non-limiting embodiments or aspects, upon receiving the training dataset, machine learning model system 102 may provide the training dataset as the input to one or more machine learning models. For example, upon receiving the training dataset, machine learning model system 102 may provide the training dataset as the input to teacher model 104 and/or student model 106. In some non-limiting embodiments or aspects, machine learning model system 102 may receive the training dataset corresponding to an output from one or more machine learning models. In some non-limiting embodiments or aspects, machine learning model system 102 may input the training dataset corresponding to the output from one or more machine learning models into another one or more machine learning models. For example, machine learning model system 102 may receive the training dataset corresponding to the output of a trained machine learning model, where the output may be provided as an input to teacher model 104 and/or student model 106.

In some non-limiting embodiments or aspects, machine learning model system 102 may use machine learning techniques to analyze the training dataset to train and provide a trained teacher model and/or a trained student model. The machine learning techniques may include, for example, supervised learning, unsupervised learning, adversarial training, unadversarial training, POE procedure, debiased focal loss, example reweighting, and/or the like. For example, machine learning model system 102 may use machine learning techniques to analyze the training dataset to train teacher model 104 and/or student model 106 and provide a trained teacher model and/or a trained student model.

In some non-limiting embodiments or aspects, the plurality of training samples may include one or more sentences (e.g., pairs of sentences), one or more images, one or more videos, one or more transactions, and/or the like. In some non-limiting embodiments or aspects, each training sample of the plurality of training samples of the training dataset may represent an institution (e.g., issuer, bank, merchant, and/or the like). In some non-limiting embodiments or aspects, each training sample of the plurality of training samples of the training dataset may be associated with an event (e.g., transaction, account opening, fund transfer, etc.). In some non-limiting embodiments or aspects, each training sample of the plurality of training samples may be received in real time (e.g., in a live situation, such as a time at which or close to a time at which operations, such as operations of machine learning model system 102 or other system or device, are carried out) with respect to an event. In some non-limiting embodiments or aspects, each training sample of the plurality of training samples may include transaction data associated with an electronic payment transaction. In some non-limiting embodiments or aspects, transaction data may include transaction parameters associated with an electronic payment transaction. Transaction parameters may include electronic wallet card data associated with an electronic card (e.g., an electronic credit card, an electronic debit card, an electronic loyalty card, and/or the like), decision data associated with a decision (e.g., a decision to approve or deny a transaction authorization request), authorization data associated with an authorization response (e.g., an approved spending limit, an approved transaction value, and/or the like), a primary account number (PAN), an authorization code (e.g., a personal identification number, etc.), data associated with a transaction amount (e.g., an approved limit, a transaction value, etc.), data associated with a transaction date and time, data associated with a conversion rate of a currency, data associated with a merchant type (e.g., goods, grocery, fuel, and/or the like), data associated with an acquiring institution country, data associated with an identifier of a country associated with the PAN, data associated with a response code, data associated with a merchant identifier (e.g., a merchant name, a merchant location, and/or the like), data associated with a type of currency corresponding to funds stored in association with the PAN, and/or the like. In some non-limiting embodiments or aspects, each training sample of the plurality of training samples may be stored and compiled into a training dataset for future training.

In some non-limiting embodiments or aspects, machine learning model system 102 may generate a plurality of input embeddings. For example, machine learning model system 102 may generate a plurality of input embedding vectors based on the plurality of training samples of the training dataset using one or more machine learning models. Additionally or alternatively, the plurality of training samples may be input embedding vectors. In some non-limiting embodiments or aspects, each of the plurality of input embedding vectors may have an input embedding size (e.g., a length of the input embedding vector). In some non-limiting embodiments or aspects, the input embedding size may be the input embedding size of one or more machine learning models of machine learning model system 102.

As shown in FIG. 3, at step 304, process 300 includes generating a noise vector. For example, upon receiving the training dataset, machine learning model system 102 may generate a noise vector. In some non-limiting embodiments or aspects, machine learning model system 102 may generate a noise vector for the plurality of training samples. For example, machine learning model system 102 may generate a noise vector for the plurality of training samples based on a uniform distribution.

In some non-limiting embodiments or aspects, when generating the noise vector, machine learning model system 102 may initialize a noise vector for the plurality of training samples. For example, machine learning model system 102 may initialize (e.g., randomize using known encryption methods) a noise vector for the plurality of training samples, where a size (e.g., a length) of the noise vector may be equivalent to an input embedding size of a machine learning model of machine learning model system 102. In some non-limiting embodiments or aspects, machine learning model system 102 may initialize the noise vector with a uniform distribution. For example, when generating the noise vector for the plurality of training samples, machine learning model system 102 may initialize the noise vector for the plurality of training samples with a uniform distribution. In some non-limiting embodiments or aspects, when initializing the noise vector for the plurality of training samples, machine learning model system 102 may multiply the uniform distribution by a predefined radius. In some non-limiting embodiments or aspects, the predefined radius may be smaller than a magnitude of the noise vector. For example, machine learning model system 102 may multiply the uniform distribution by a predefined radius to provide a second uniform distribution for the plurality of training samples. In some non-limiting embodiments or aspects, when initializing the noise vector for the plurality of training samples, machine learning model system 102 may divide the second uniform distribution by a square root of an input embedding size of the machine learning model. For example, when initializing the noise vector for the plurality of training samples, machine learning model system 102 may divide the second uniform distribution by a square root of an input embedding size of the input embedding size of the machine learning model to provide an initial value of the noise vector.

In some non-limiting embodiments or aspects, machine learning model system 102 may perturb each training sample of the plurality of training samples. In some non-limiting embodiments or aspects, machine learning model system 102 may perturb each training sample of the plurality of training samples based on the noise vector. For example, machine learning model system 102 may perturb each training sample of the plurality of training samples based on the noise vector to provide a plurality of perturbed training samples. In some non-limiting embodiments or aspects, when perturbing each training sample of the plurality of training samples, machine learning model system 102 may add the noise vector to each of the training samples of the plurality of training samples.

As shown in FIG. 3, at step 306, process 300 includes obtaining a gradient. For example, machine learning model system 102 may obtain a gradient. In some non-limiting embodiments or aspects, the gradient may be a derivative (e.g., a partial derivative) of a function (e.g., a loss function) that has more than one input variable (e.g., a plurality of training samples and/or a plurality of perturbed training samples). For example, machine learning model system 102 may obtain (e.g., calculate) the gradient of a function (e.g., a loss function) where the input variables may be the plurality of training samples and/or the plurality of perturbed training samples. In some non-limiting embodiments or aspects, machine learning model system 102 may obtain the gradient with respect to the noise vector. For example, machine learning model system 102 may obtain the gradient with respect to the noise vector based on the plurality of training samples and/or the plurality of perturbed training samples.

In some non-limiting embodiments or aspects, machine learning model system 102 may determine a direction of the gradient. In some non-limiting embodiments or aspects, the direction of the gradient may be a direction (e.g., a moving direction) of a vector that starts from one of the plurality of training samples and ends at a respective perturbed training sample of the plurality of perturbed training samples.

In some non-limiting embodiments or aspects, machine learning model system 102 may obtain the gradient between a first output of a machine learning model and a second output of the machine learning model. In some non-limiting embodiments or aspects, the first output of the machine learning model may result from inputting each training sample of the plurality of training samples into the machine learning model. In some non-limiting embodiments or aspects, the second output of the machine learning model may result from inputting each perturbed training sample of the plurality of perturbed training samples into the machine learning model.

As shown in FIG. 3, at step 308, process 300 includes generating an updated noise vector. For example, machine learning model system 102 may generate an updated noise vector. In some non-limiting embodiments or aspects, machine learning model system 102 may generate the updated noise vector based on the gradient.

In some non-limiting embodiments or aspects, when generating the updated noise vector, machine learning model system 102 may multiply the gradient by a step size. For example, machine learning model system 102 may multiply the gradient by a step size to normalize the direction of the gradient. In some non-limiting embodiments or aspects, a value of the step size may be positive or negative. In some non-limiting embodiments or aspects, the value of the step size may be manipulated to minimize or maximize the loss function (e.g., change a direction of the gradient). In some non-limiting embodiments or aspects, the step size may be multiplied by −1 to minimize the training loss.

In some non-limiting embodiments or aspects, machine learning model system 102 may restrict a value of the updated noise vector. For example, machine learning model system 102 may restrict (e.g., clamp) a value of the updated noise vector. In some non-limiting embodiments or aspects, machine learning model system 102 may restrict a value of the updated noise vector based on a predefined radius to provide a second updated noise vector.

In some non-limiting embodiments or aspects, machine learning model system 102 may perturb each training sample of the plurality of training samples based on the updated noise vector. For example, machine learning model system 102 may perturb each training sample of the plurality of training samples based on the updated noise vector to provide a second plurality of perturbed training samples. In some non-limiting embodiments or aspects, when perturbing each training sample of the plurality of training samples based on the updated noise vector to provide the second plurality of perturbed training samples, machine learning model system 102 may perturb each training sample of the plurality of training samples based on the second updated noise vector to provide the second plurality of perturbed training samples. In some non-limiting embodiments or aspects, the machine learning model system 102 may perturb each training sample of the plurality of training samples by adding the updated noise vector to the plurality of training samples.

As shown in FIG. 3, at step 310, process 300 includes updating a model weight of the machine learning model. For example, machine learning model system 102 may update a model weight of teacher model 104 based on the second plurality of perturbed training samples to provide the trained machine learning. In some non-limiting embodiments or aspects, the trained machine learning model may be a first trained machine learning model. In some non-limiting embodiments or aspects, the first trained machine learning model may be teacher model 104.

In some non-limiting embodiments or aspects, machine learning model system 102 may train a second machine learning model using a POE procedure. The POE procedure may be an ensemble method for combining the predictions of at least two models (e.g., a first biased model (e.g., the teacher model) and a second biased model (e.g., the student model) that is less biased than the first biased model). The POE procedure may use the predictions of the first trained model (e.g., teacher model 104) as guidance for training the second model (e.g., student model 106). In some non-limiting embodiments or aspects, machine learning model system 102 may train a second machine learning model using a POE procedure based on the first trained machine learning model. For example, machine learning model system 102 may train student model 106 using a POE procedure based on the trained teacher model 104.

In some non-limiting embodiments or aspects, when training the second machine learning model using the POE procedure, machine learning model system 102 may generate an unnormalized output from the first trained machine learning model. For example, when training student model 106 using the POE procedure, machine learning model system 102 may generate an unnormalized output from the trained teacher model 104 based on the plurality of training samples of the training dataset.

In some non-limiting embodiments or aspects, when training the second machine learning model using the POE procedure, machine learning model system 102 may generate an unnormalized output from the second machine learning model. For example, when training student model 106 using the POE procedure, machine learning model system 102 may generate an unnormalized output from student model 106 based on the plurality of training samples of the training dataset.

In some non-limiting embodiments or aspects, machine learning model system 102 may combine the unnormalized output from the first trained machine learning model and the unnormalized output from the second machine learning model to provide a combined unnormalized output. For example, machine learning model system 102 may combine the unnormalized output from the trained teacher model 104 and the unnormalized output from student model 106 to provide a combined unnormalized output.

In some non-limiting embodiments or aspects, machine learning model system 102 may update a model weight of the second machine learning model. For example, machine learning model system 102 may update a model weight of student model 106 based on the combined unnormalized output to provide the trained student model 106.

In some non-limiting embodiments or aspects, when generating the unnormalized output from the first trained machine learning model based on the plurality of training samples of the training dataset, machine learning model system 102 may generate an output of the first trained machine learning model using a first logits function. For example, when generating the unnormalized output from the trained teacher model 104 based on the plurality of training samples of the training dataset, machine learning model system 102 may generate an output of the trained teacher model 104 using a first logits function based on the plurality of training samples of the training dataset.

In some non-limiting embodiments or aspects, when generating the unnormalized output from the second machine learning model based on the plurality of training samples of the training dataset, machine learning model system 102 may generate an output of the second trained machine learning model using a second logits function. For example, when generating the unnormalized output from student model 106 based on the plurality of training samples of the training dataset, machine learning model system 102 may generate an output of student model 106 using a second logits function based on the plurality of training samples of the training dataset.

In some non-limiting embodiments or aspects, when combining the unnormalized output from the first trained machine learning model and the unnormalized output from the second machine learning model to provide a combined unnormalized output, machine learning model system 102 may combine the output of the first trained machine learning model using the first logits function based on the plurality of training samples of the training dataset and the output of the second machine learning model using the second logits function based on the plurality of training samples of the training dataset to provide a combined output. For example, when combining the unnormalized output from the trained teacher model 104 and the unnormalized output from the student model 106 to provide a combined unnormalized output, machine learning model system 102 may combine the output of the trained teacher model 104 using the first logits function based on the plurality of training samples of the training dataset and the output of the student model 106 using the second logits function based on the plurality of training samples of the training dataset to provide a combined output.

In some non-limiting embodiments or aspects, when updating the model weight of the second machine learning model based on the combined unnormalized output to provide the second trained machine learning model, machine learning model system 102 may update the model weight of the second machine learning model based on the combined output to provide the second trained machine learning model. For example, when updating the model weight of the student model 106 based on the combined unnormalized output to provide the trained student model 106, machine learning model system 102 may update the model weight of the student model 106 based on the combined output to provide the trained student model 106.

In some non-limiting embodiments or aspects, machine learning model system 102 may train one or more machine learning models to perform one or more tasks. For example, machine learning model system 102 may train teacher model 104 and/or student model 106 to perform one or more tasks. In some non-limiting embodiments or aspects, the one or more tasks may include natural language inference processing tasks. For example, machine learning model system 102 may train teacher model 104 and/or student model 106 to determine an inference relation between a pair of sentences (e.g., a premise and a hypothesis). In some non-limiting embodiments or aspects, the inference relation may be one of entailment (e.g., the premise and the hypothesis are similar), contradiction (e.g., the premise and the hypothesis are not similar), and/or neutral (e.g., the premise and the hypothesis are neither similar nor contradictory).

In some non-limiting embodiments or aspects, machine learning model system 102 may train one or more machine learning models using a transformer-based machine learning technique for natural language processing. In some non-limiting embodiments or aspects, machine learning model system 102 may train teacher model 104 using unadversarial training techniques. In some non-limiting embodiments or aspects, machine learning model system 102 may train student model 106 using a POE procedure. In some non-limiting embodiments or aspects, teacher model 104 and/or student model 106 may be a bidirectional encoder representations from transformers (BERT) model. In some non-limiting embodiments or aspects, a BERT model may be trained on two natural language processing tasks (e.g., masked language modeling and next sentence predictions).

In some non-limiting embodiments or aspects, machine learning model system 102 may validate one or more machine learning modes. For example, after training one or more machine learning models, machine learning model system 102 may validate one or more machine learning models. In some non-limiting embodiments or aspects, machine learning model system 102 may validate one or more machine learning models based on a validation threshold.

In some non-limiting embodiments or aspects, machine learning model system 102 may store one or more trained machine learning models. For example, machine learning model system 102 may store a trained teacher model and/or a trained student model in a data structure (e.g., a database). The data structure may be located within machine learning model system 102 or external (e.g., remote from) machine learning model system 102.

Figure 4A:
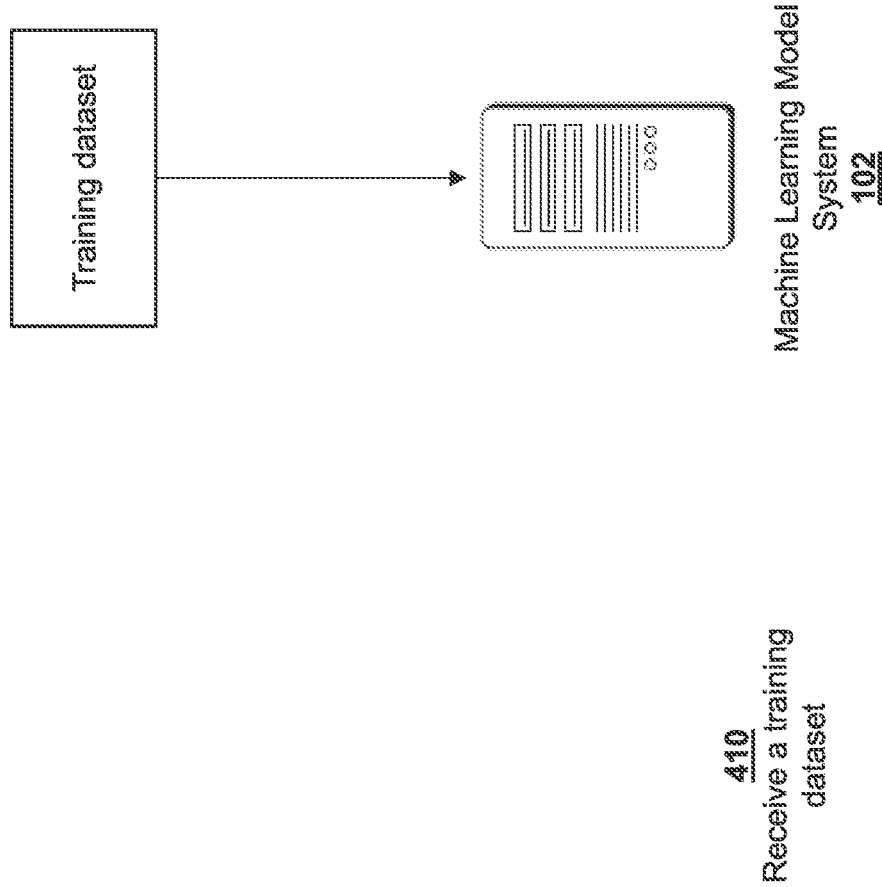
FIGS. 4A-4O are diagrams of non-limiting embodiments or aspects of an implementation of a process for mitigating dataset biases while generating machine learning models for classification tasks.
Figure 4E:
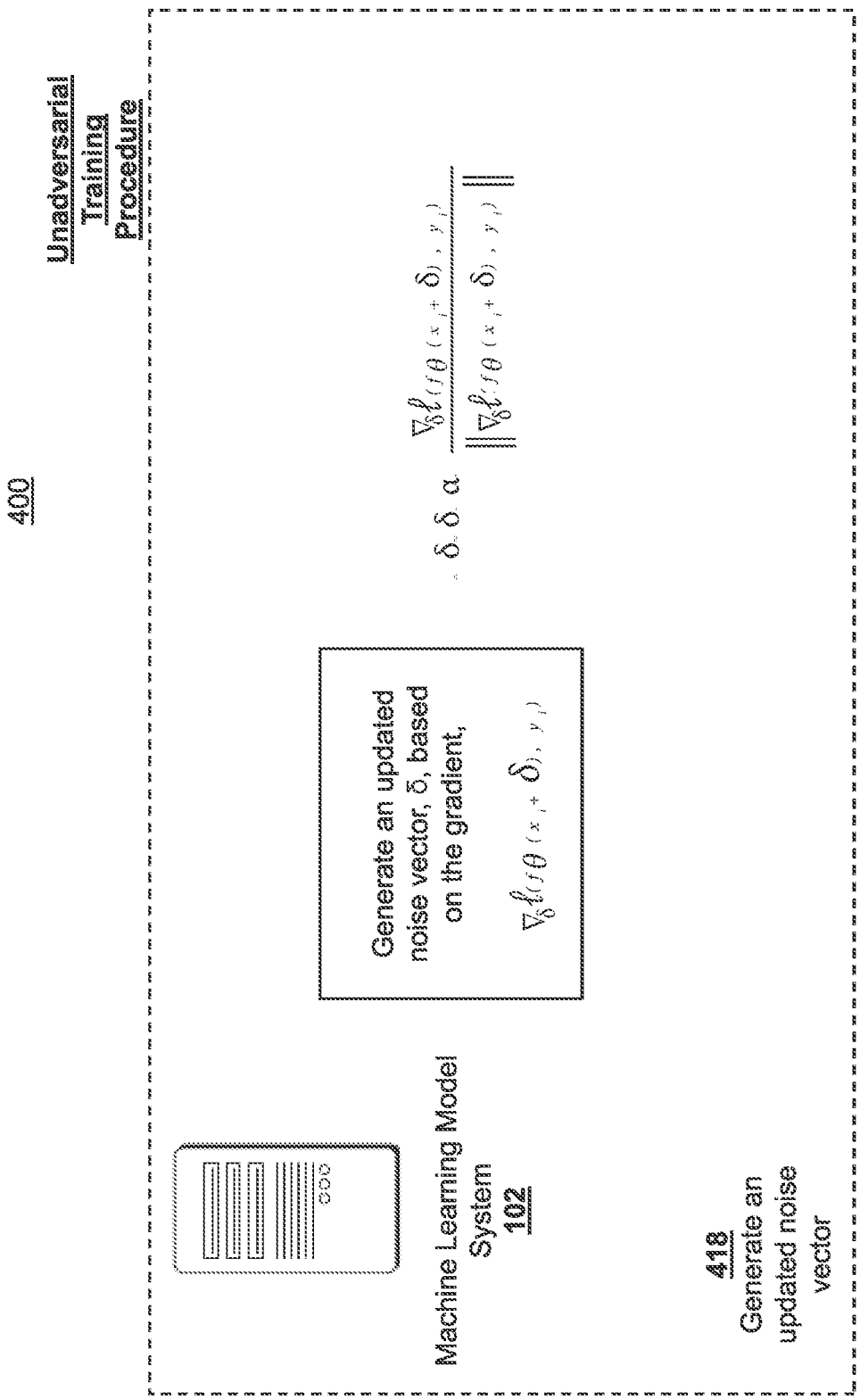
Figure 4F:
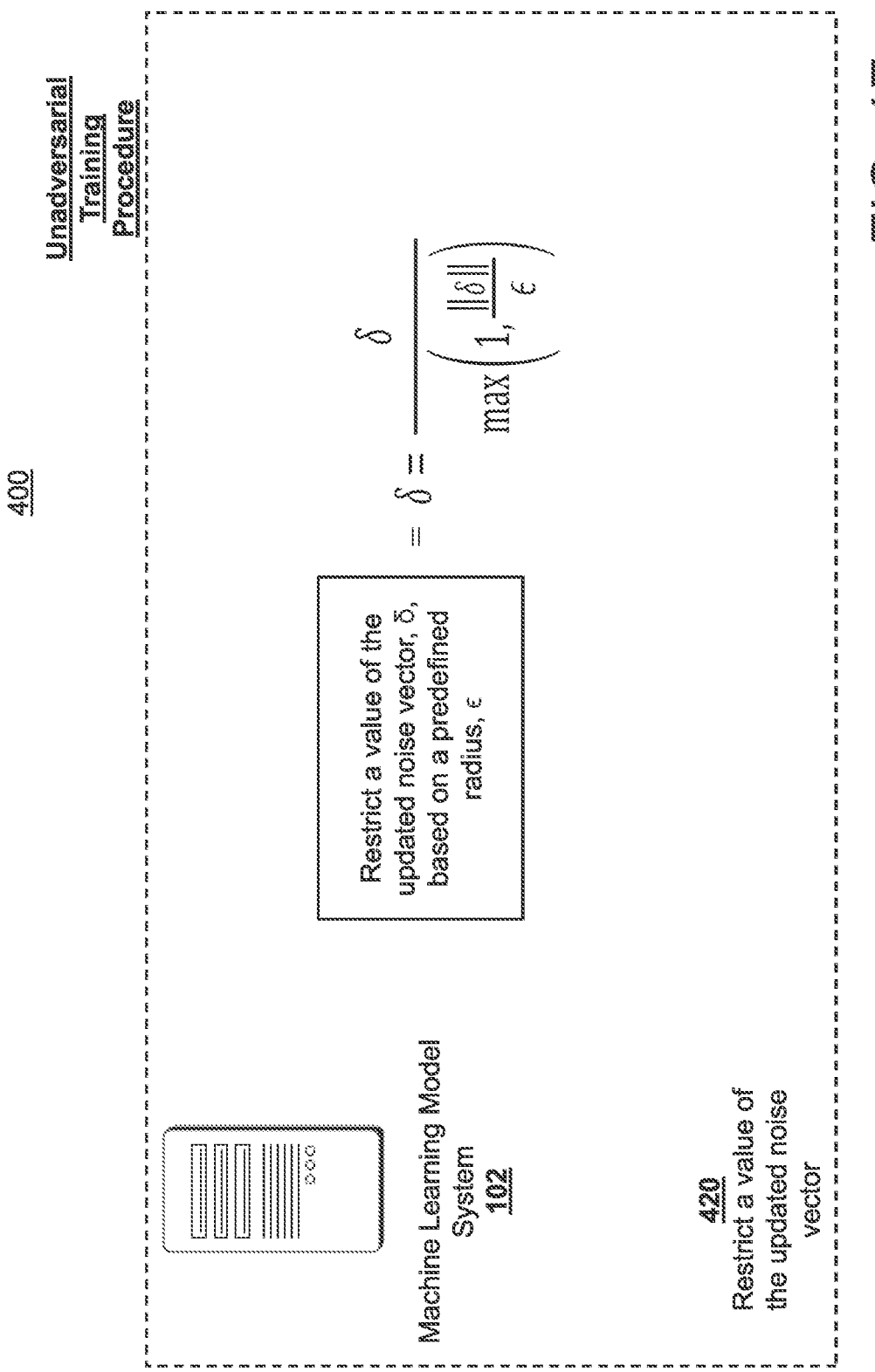
Figure 4G:
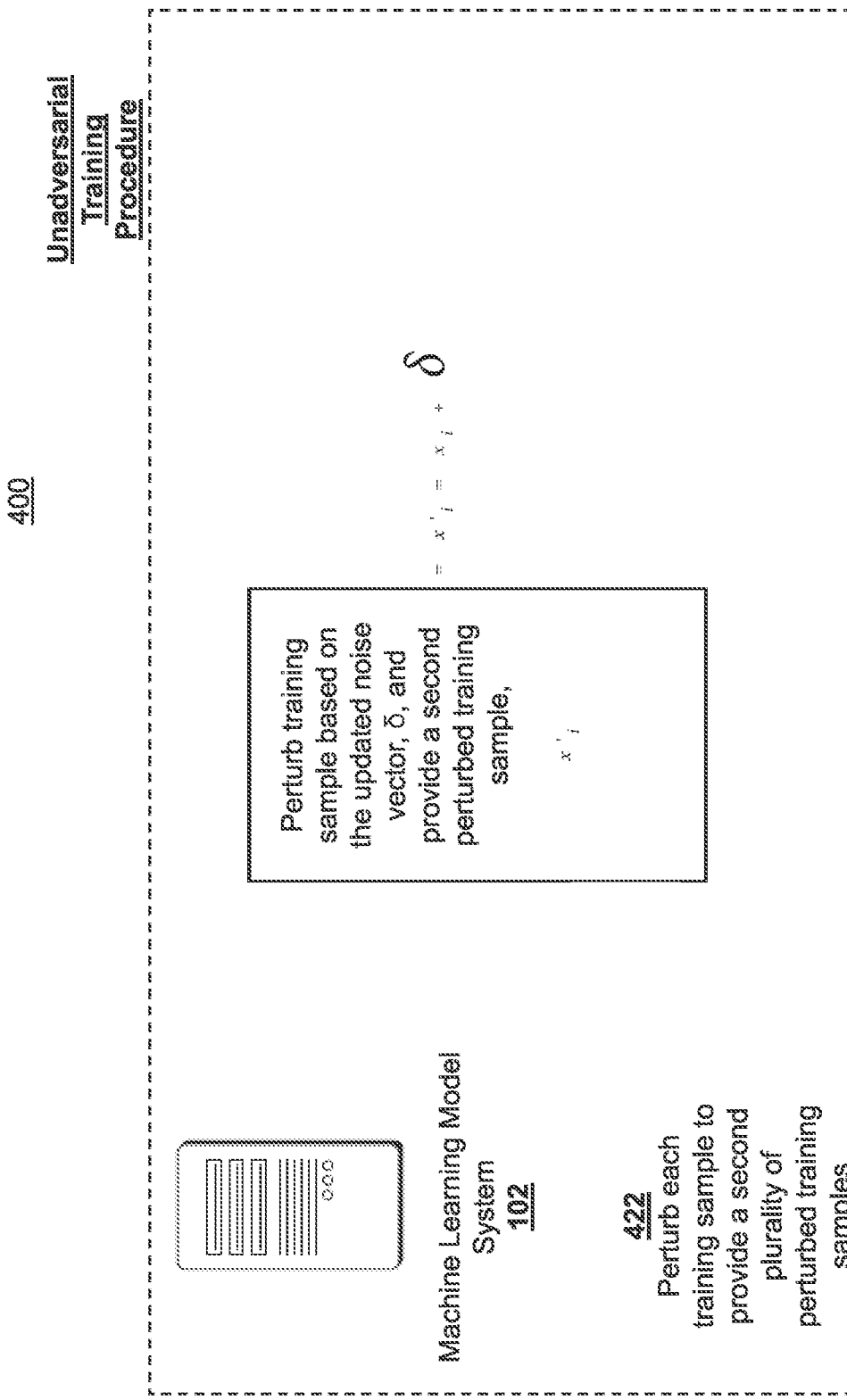
Figure 4H:
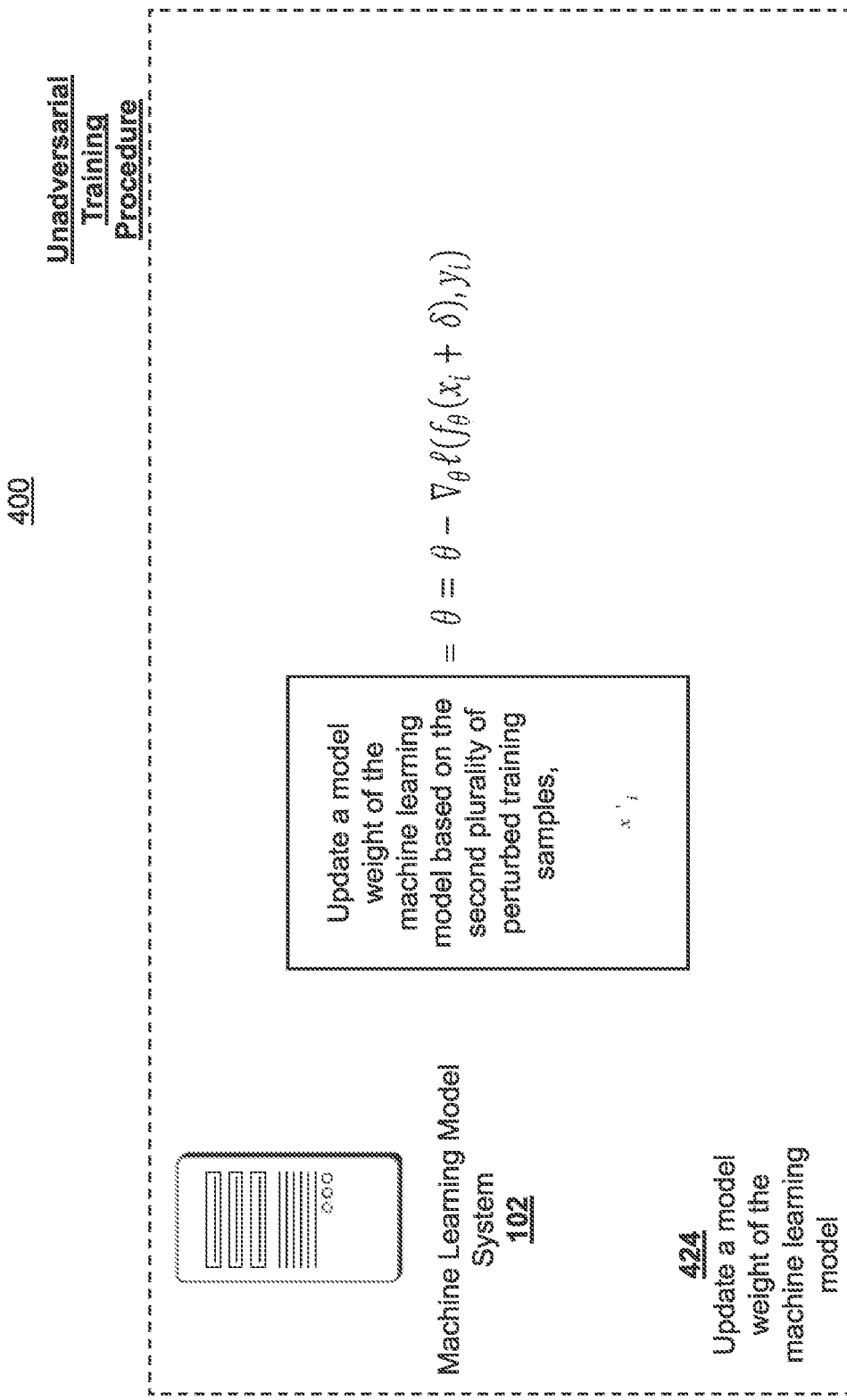
Figure 4I:
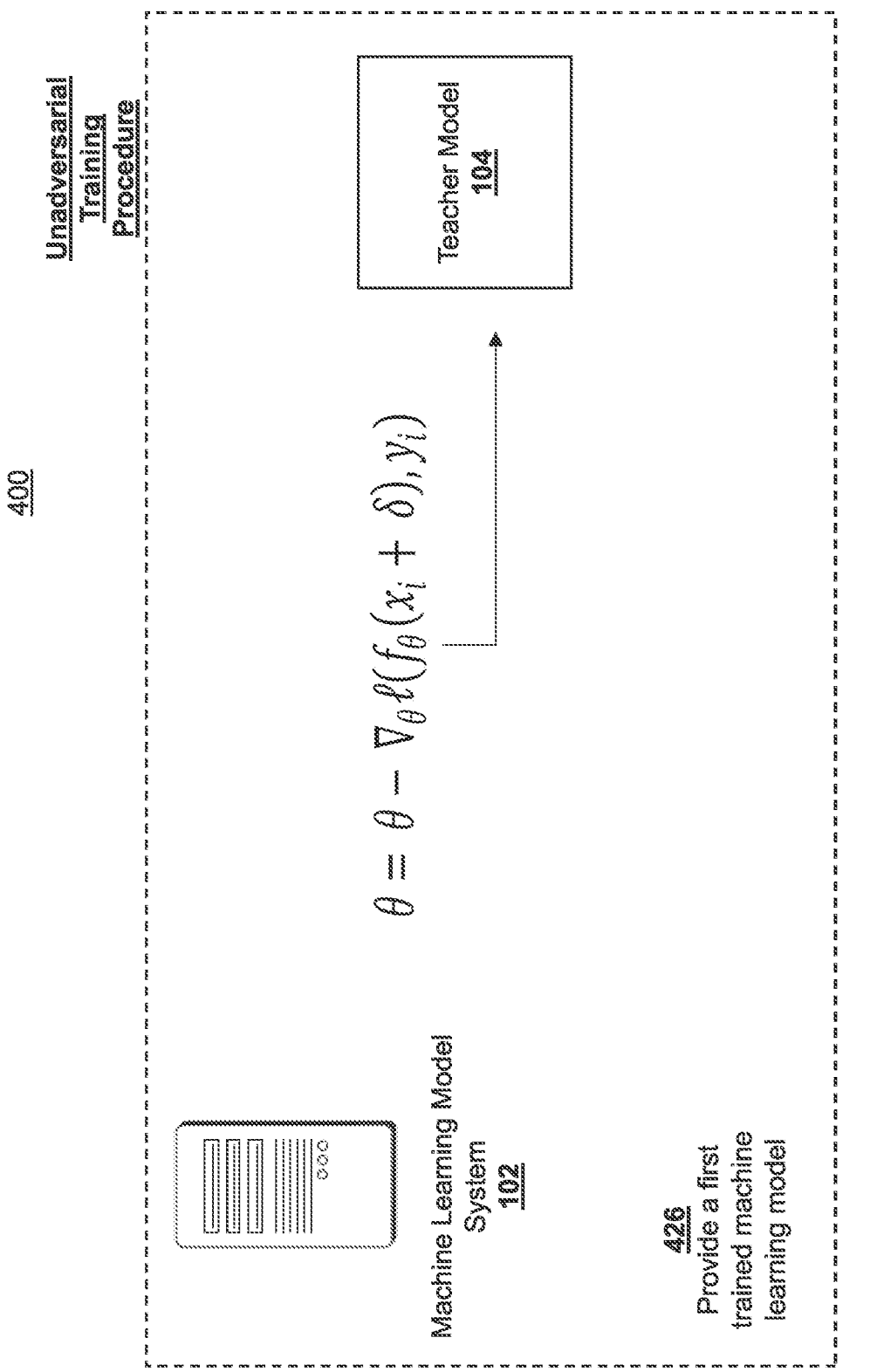
Figure 4J:
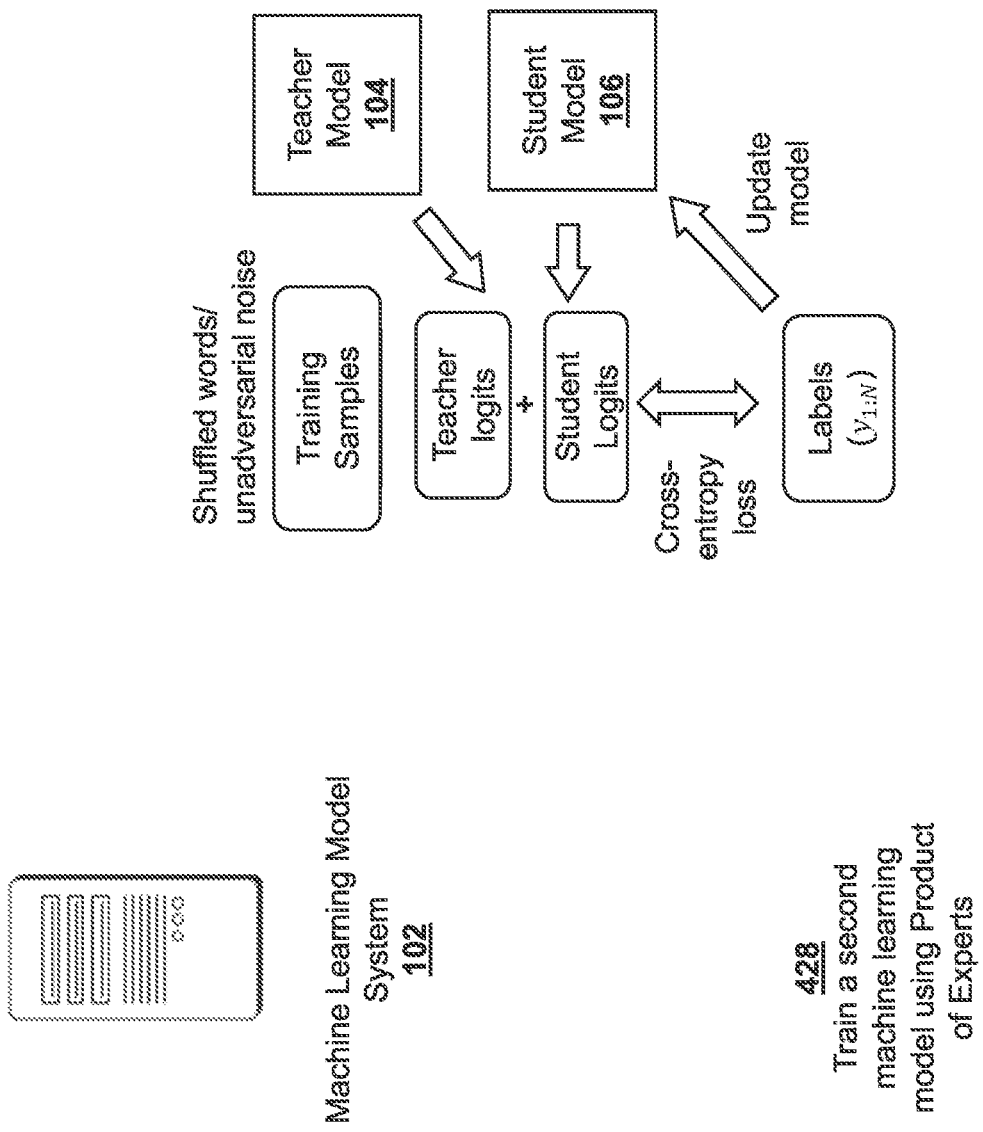
Figure 4K:
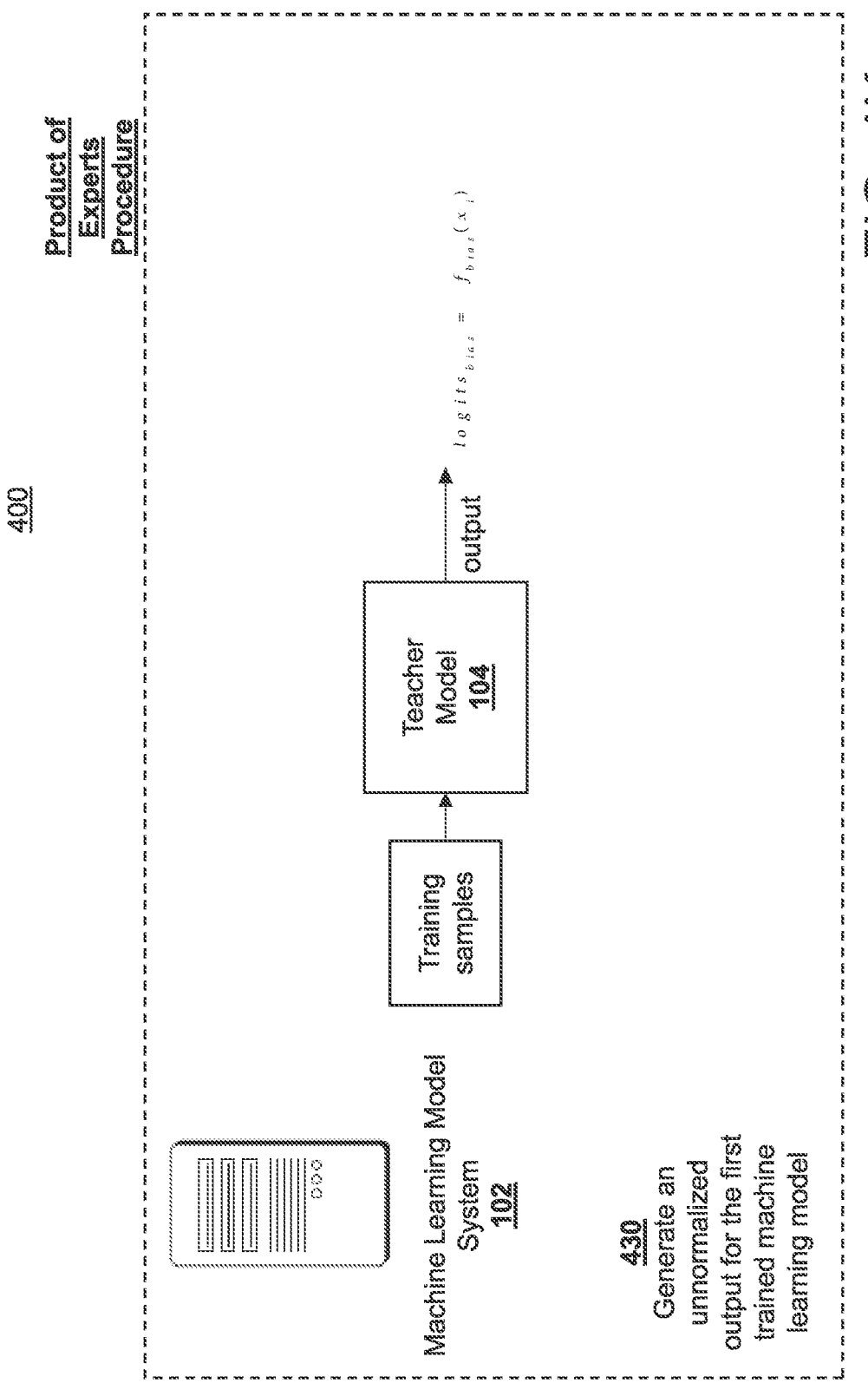
Figure 4L:
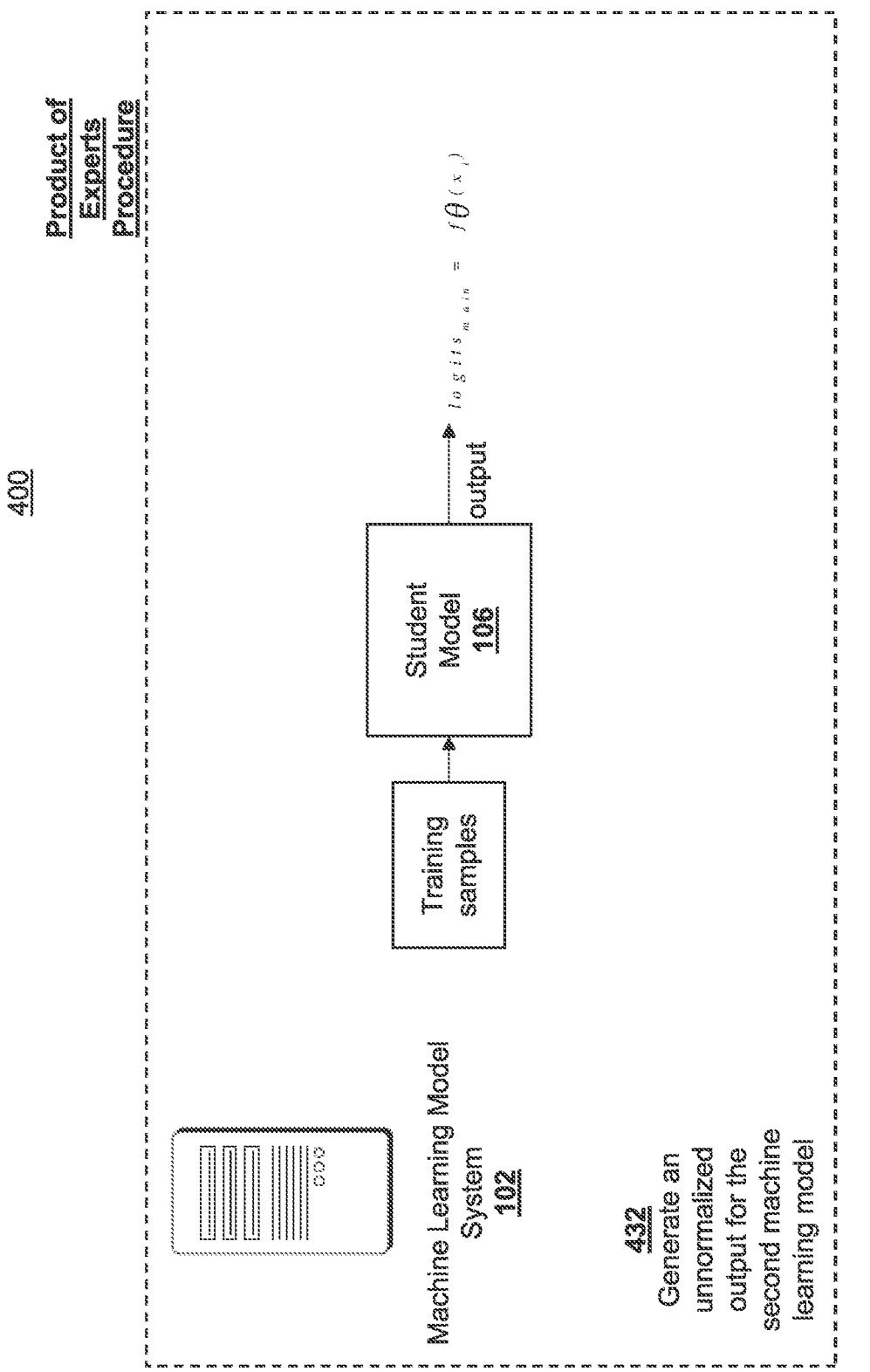
Figure 4N:
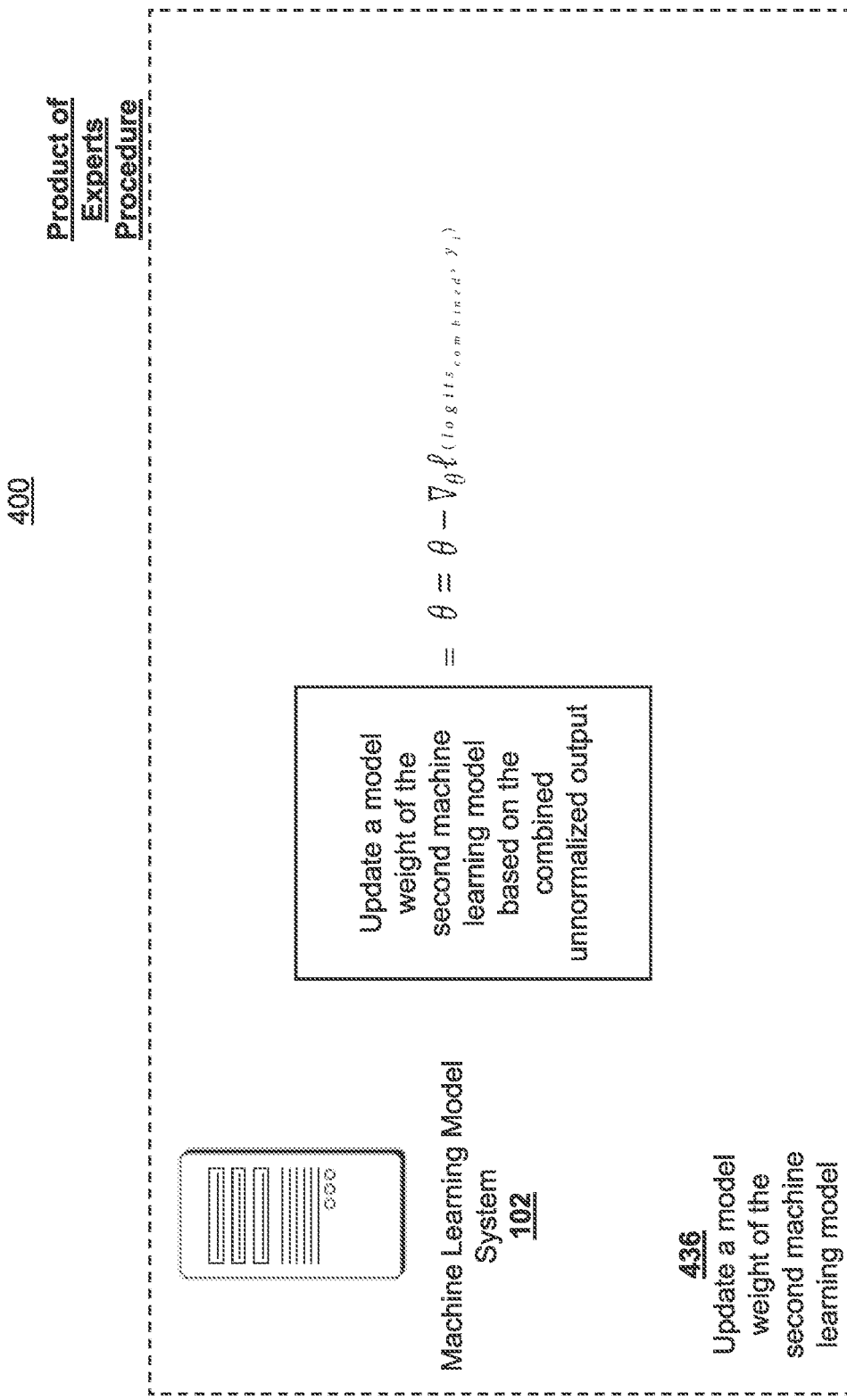
Figure 4O:
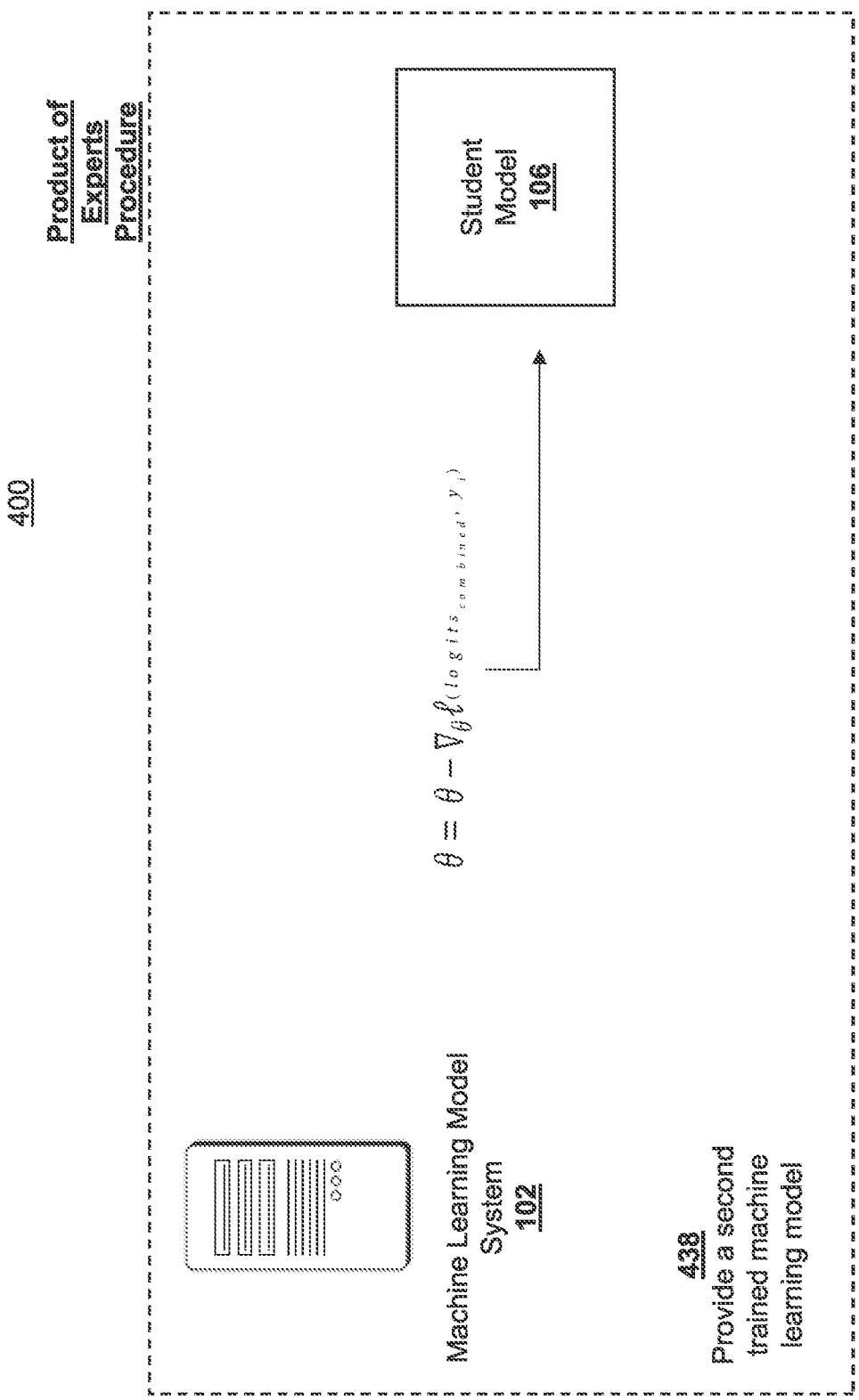

Referring now to FIGS. 4A-4O, shown are diagrams of an implementation 400 of a process (e.g., process 300) for mitigating dataset biases while generating machine learning models for classification tasks. As shown in FIGS. 4A-4O, implementation 400 may include machine learning model system 102 (e.g., one or more devices of machine learning model system 102) performing one or more steps of the process. In some non-limiting embodiments or aspects, machine learning model system 102 may train one or more machine learning models using unadversarial training. For example, machine learning model system 102 may train one or more machine learning models using unadversarial training as shown in FIGS. 4B-4I. In some non-limiting embodiments or aspects, machine learning model system 102 may train one or more machine learning models using a POE procedure. For example, machine learning model system 102 may train one or more machine learning models using a POE procedure as shown in FIGS. 4J-4O.

As shown in FIG. 4A, at step 410, machine learning model system 102 may receive a training dataset (e.g., $[x_1, x_2 \ldots x_m]$). In some non-limiting embodiments or aspects, the training dataset may be a Multi-genre Natural Language Inference (MNLI) dataset. In some non-limiting embodiments or aspects, machine learning model system 102 may receive the training dataset, $[x_1, x_2 \ldots x_m]$, from database 108.

In some non-limiting embodiments or aspects, one or more machine learning models may be trained using the training dataset, $[x_1, x_2 \ldots x_m]$.

In some non-limiting embodiments or aspects, the one or more machine learning models may be defined by a function, $f$, with parameters, $\theta$. In some non-limiting embodiments or aspects, the training dataset may include a plurality of training samples (e.g., $x_i$). In some non-limiting embodiments or aspects, the plurality of training samples may be labeled. In some non-limiting embodiments or aspects, the plurality of training samples, $x_i$, may be input embedding vectors. For example, the plurality of training samples may be word embeddings. In some non-limiting embodiments or aspects, the plurality of training samples may have an input embedding size, $L_i$ (e.g., a vector length of $x_i$).

In some non-limiting embodiments or aspects, machine learning model system 102 may use unadversarial training techniques to analyze the training dataset, $[x_1, x_2 \ldots x_m]$. In some non-limiting embodiments or aspects, the unadversarial training techniques may be based on known adversarial training techniques. For example, a known adversarial training procedure, which is used to perturb training samples (e.g., in a first direction) of a training dataset to increase a training loss, may be mimicked. An unadversarial training procedure may perturb the plurality of training samples of the training dataset (e.g., in a second direction) to decrease the training loss.

In some non-limiting embodiments or aspects, machine learning model system 102 may perform an unadversarial training procedure to train one or more machine learning models. For example, machine learning model system 102 may perform an unadversarial training procedure to train teacher model 104 and provide a trained teacher model. Non-limiting embodiments or aspects of the unadversarial training procedure for training teacher model 104 are shown in FIGS. 4B-4I.

As shown in FIG. 4B, at step 412, machine learning model system 102 may generate a noise vector for the plurality of training samples based on a uniform distribution. In some non-limiting embodiments or aspects, when generating the noise vector for the plurality of training samples, machine learning model system 102 may initialize the noise vector with a uniform distribution. For example, for each training sample, $x_i$, of the plurality of training samples, machine learning model system 102 may initialize the noise vector, $\delta$, with a uniform distribution. In some non-limiting embodiments or aspects, a size of the noise vector, $\delta$, may be the same as a size of the input embedding, $L_i$. In some non-limiting embodiments or aspects, initializing the noise vector, $\delta$, may include multiplying the uniform distribution by a predefined radius, $E$, to provide a second uniform distribution. In some non-limiting embodiments or aspects, initializing the noise vector, $\delta$, may include dividing the second uniform distribution by the square root of the size of the input embedding, $L_i$. In some non-limiting embodiments or aspects, the noise vector, $\delta$, may be initialized with a uniform distribution according to the following:

$$\delta = \frac{1}{\sqrt{L_i}} \text{UNIFORM}(-\epsilon, \epsilon)$$

As shown in FIG. 4C, at step 414, machine learning model system 102 may perturb each training sample. For example, machine learning model system 102 may perturb each training sample, $x_i$, of the plurality of training samples based on the noise vector, $\delta$, to provide a plurality of perturbed training samples. In some non-limiting embodiments or aspects, the plurality of training samples, $x_i$, may be perturbed by adding the noise vector, $\delta$.

As shown in FIG. 4D, at step 416, machine learning model system 102 may obtain a gradient. For example, machine learning model system 102 may obtain a gradient with regard to the noise vector, $\delta$. In some non-limiting embodiments or aspects, machine learning model system 102 may obtain a gradient between a first output for the machine learning model that results from inputting each training sample of the plurality of training samples and a second output of the machine learning model that results from inputting each perturbed training sample of the plurality of perturbed training samples. For example, the gradient may be the difference between the loss obtained from the perturbed inputs (e.g., plurality of training samples perturbed based on the noise vector) and the plurality of training samples (e.g., labeled training samples).

As shown in FIG. 4E, at step 418, machine learning model system 102 may generate an updated noise vector. For example, machine learning model system 102 may generate an updated noise vector, $\delta$, based on the obtained gradient. In some non-limiting embodiments or aspects, machine learning model system 102 may generate the noise vector, $\delta$, by multiplying the gradient by a step size, a. In some non-limiting embodiments or aspects, in order to minimize the training loss, the step size, a, may be multiplied by −1. In some non-limiting embodiments or aspects, machine learning model system 102 may generate the updated noise vector, $\delta$, based on the following ($y_i$ is a correct label (e.g., label for the training sample)):

$$\delta = \delta - \alpha \cdot \frac{\nabla_\delta \ell(f_\theta(x_i + \delta), y_i)}{\|\nabla_\delta \ell(f_\theta(x_i + \delta), y_i)\|}$$

As shown in FIG. 4F, at step 420, machine learning model system 102 may restrict a value of the updated noise vector. For example, machine learning system 102 may restrict (e.g., clamp) a value of the updated noise vector, $\delta$, based on a predefined radius, E, to provide a second updated noise vector, $\delta$. In some non-limiting embodiments or aspects, the second updated noise vector may be generated based on the following:

$$\delta = \frac{\delta}{\max\left(1, \frac{\|\delta\|}{\epsilon}\right)}$$

As shown in FIG. 4G, at step 422, machine learning model system 102 may perturb each training sample to provide a second plurality of perturbed training samples. For example, machine learning model system 102 may perturb each training sample, $x_i$, of the plurality of training samples based on the updated noise vector, $\delta$, to provide a second plurality of perturbed training samples, $x'_i$. In some non-limiting embodiments or aspects, each training sample of the plurality of training samples, $x_i$, may be updated by adding the updated noise vector, $\delta$, based on the following:

$$x'_i = x_i + \delta$$

As shown in FIG. 4H, at step 424, machine learning model system 102 may update a model weight of the machine learning model. For example, machine learning model system 102 may update a model weight of the machine learning model based on the second plurality of perturbed training samples, $x'_i$, to provide the trained machine learning model. In some non-limiting embodiments or aspects, the model weight of the machine learning model may be updated based on the following:

$$\theta = \theta - \nabla_\theta l(f_\theta(x_i + \delta), y_i)$$

As shown in FIG. 4I, at step 426, machine learning model system 102 may provide a first trained machine learning model. For example, machine learning model system 102 may provide a first trained machine learning model based on updating the model weight of the machine learning model. In some non-limiting embodiments or aspects, the first trained machine learning model may be teacher model 104.

As shown in FIG. 4J, at step 428, machine learning model system 102 may train a second machine learning model using a POE procedure. For example, machine learning model system 102 may train one or more machine learning models using a POE procedure. In some non-limiting embodiments or aspects, machine learning model system 102 may train student model 106 using a POE procedure based on the trained teacher model. Non-limiting embodiments or aspects of training student model 106 using the POE procedure are shown in FIGS. 4J-4P.

As shown in FIG. 4K, at step 430, machine learning model system 102 may generate an unnormalized output for the first trained machine learning model. For example, machine learning model system 102 may generate an unnormalized output for trained teacher model 104 based on inputting the plurality of training samples of the training dataset into trained teacher model 104. In some non-limiting embodiments or aspects, when generating the unnormalized output from the first trained machine learning model based on the plurality of training samples of the training dataset, machine learning model system 102 may generate an output of the first trained machine learning model using a first logits function (e.g., $\text{logits}_{bias}$) based on the plurality of training samples of the training dataset, $x_i$. For example, machine learning model system 102 may generate an output of trained teacher model 104 based on the following:

$$\text{logits}_{bias} = f_{bias}(x_i)$$

As shown in FIG. 4L, at step 432, machine learning model system 102 may generate an unnormalized output for the second machine learning model. For example, machine learning model system 102 may generate an unnormalized output for student model 106. In some non-limiting embodiments or aspects, when generating the unnormalized output from the second machine learning model based on the plurality of training samples of the training dataset, machine learning model system 102 may generate an output of the second trained machine learning model using a second logits function (e.g., $\text{logits}_{main}$) based on the plurality of training samples of the training dataset, $x_i$. For example, machine learning model system 102 may generate an output of student model 106 based on the following:

$$\text{logits}_{main} = f_\theta(x_i)$$

As shown in FIG. 4M, at step 434, machine learning model system 102 may combine the unnormalized outputs. For example, machine learning model system 102 may combine the unnormalized output from the first trained machine learning model and the output from the second machine learning model to provide a combine unnormalized output. In some non-limiting embodiments or aspects, when combining the unnormalized output from the first trained machine learning model and the unnormalized output from the second machine learning model to provide a combined unnormalized output, machine learning model system 102 may combine the output of the first trained machine learning model using the first logits function based on the plurality of training samples of the training dataset and the output of the second trained machine learning model using the second logits function based on the plurality of training samples of the training dataset to provide a combined output. For example, machine learning model system 102 may combine the output of trained teacher model 104 using the first logits function (e.g., $logits_{bias}$) based on the plurality of training samples of the training dataset and the output of student model 106 using the second logits function (e.g., $logits_{main}$) based on the plurality of training samples of the training dataset to provide a combined output (e.g., $logits_{combined}$) based on the following:

$$logits\ combined = logits_{main} + logits_{bias}$$

As shown in FIG. 4N, at step 436, machine learning model system 102 may update a model weight of the second machine learning model. In some non-limiting embodiments or aspects, machine learning model system 102 may update a weight of the second machine learning model based on the combined unnormalized output (e.g., $logits_{combined}$). For example, machine learning model system 102 may update a weight of student model 106 based on the following:

$$\theta = \theta - \nabla_\theta l(logits_{combined}, y_i)$$

As shown in FIG. 4O, at step 438, machine learning model system 102 may provide a second trained machine learning model. For example, machine learning model system 102 may provide trained student model 106. In some non-limiting embodiments or aspects, when updating the model weight of the second machine learning model based on the combined unnormalized output to provide the second trained machine learning model, machine learning model system 102 may update the model weight of the second machine learning model based on the combined output to provide the second trained machine learning model.

In some non-limiting embodiments or aspects, the first machine learning model (e.g., the teacher model) and the second machine learning model (e.g., the student model) may be bidirectional encoder representations from transformers (BERT) models. In some non-limiting embodiments or aspects, the biased model (e.g., the teacher model) may be a BERT model with at least two layers and a hidden size of 128 (e.g., 128 hidden layers).

Although the above methods, systems, and computer program products have been described in detail for the purpose of illustration based on what is currently considered to be the most practical and preferred embodiments, it is to be understood that such detail is solely for that purpose and that the present disclosure is not limited to the described embodiments but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect. In fact, any of these features can be combined in ways not specifically recited in the claims and/or disclosed in the specification. Although each dependent claim listed below may directly depend on only one claim, the disclosure of possible implementations includes each dependent claim in combination with every other claim in the claim set.

What is claimed is:

1. A system, the system comprising:
at least one processor programmed or configured to:
perform an unadversarial training procedure to train a machine learning model to provide a trained machine learning model, wherein, when performing the unadversarial training procedure, the at least one processor is programmed or configured to:
receive a training dataset comprising a plurality of training samples;
generate a noise vector for the plurality of training samples based on a first uniform distribution;
perturb each training sample of the plurality of training samples based on the noise vector to provide a plurality of perturbed training samples;
obtain a gradient between a first output of the machine learning model that results from inputting each training sample of the plurality of training samples and a second output of the machine learning model that results from inputting each perturbed training sample of the plurality of perturbed training samples;
generate an updated noise vector based on the gradient;
perturb each training sample of the plurality of training samples based on the updated noise vector to provide a second plurality of perturbed training samples; and
update a model weight of the machine learning model based on the second plurality of perturbed training samples to provide the trained machine learning model;
wherein, the trained machine learning model is a first trained machine learning model that exploits bias features of the training dataset to make predictions, and wherein the at least one processor is further programmed or configured to:
train a second machine learning model using a Product of Experts (POE) procedure based on the first trained machine learning model to provide improved predictions as compared to the first trained machine learning model.

2. The system of claim 1, wherein, when generating the noise vector for the plurality of training samples, the at least one processor is programmed or configured to:
initialize the noise vector with a uniform distribution, wherein, when initializing the noise vector, the at least one processor is programmed or configured to:
multiply the first uniform distribution by a predefined radius to provide a second uniform distribution; and
divide the second uniform distribution by a square root of an input embedding size of the machine learning model to provide an initial value of the noise vector.

3. The system of claim 1, wherein, when generating the updated noise vector, the at least one processor is programmed or configured to:
multiply the gradient by a step size.

4. The system of claim 1, wherein, the at least one processor is further programmed or configured to:

restrict a value of the updated noise vector based on a predefined radius to provide a second updated noise vector; and wherein, when perturbing each training sample of the plurality of training samples based on the updated noise vector to provide the second plurality of perturbed training samples, the at least one processor is programmed or configured to:

perturb each training sample of the plurality of training samples based on the second updated noise vector to provide the second plurality of perturbed training samples.

5. The system of claim 1, wherein, when training the second machine learning model using the POE procedure, the at least one processor is further programmed or configured to:

generate an unnormalized output from the first trained machine learning model based on the plurality of training samples of the training dataset;

generate an unnormalized output from the second machine learning model based on the plurality of training samples of the training dataset;

combine the unnormalized output from the first trained machine learning model and the unnormalized output from the second machine learning model to provide a combined unnormalized output; and update a model weight of the second machine learning model based on the combined unnormalized output to provide the second trained machine learning model.

6. The system of claim 5, wherein, when generating the unnormalized output from the first trained machine learning model based on the plurality of training samples of the training dataset, the at least one processor is programmed or configured to:

generate an output of the first trained machine learning model using a first logits function based on the plurality of training samples of the training dataset;

wherein, when generating the unnormalized output from the second machine learning model based on the plurality of training samples of the training dataset, the at least one processor is programmed or configured to:

generate an output of the second trained machine learning model using a second logits function based on the plurality of training samples of the training dataset;

wherein, when combining the unnormalized output from the first trained machine learning model and the unnormalized output from the second machine learning model to provide the combined unnormalized output, the at least one processor is programmed or configured to:

combine the output of the first trained machine learning model using the first logits function based on the plurality of training samples of the training dataset and the output of the second machine learning model using the second logits function based on the plurality of training samples of the training dataset to provide a combined output; and wherein, when updating the model weight of the second machine learning model based on the combined unnormalized output to provide the second trained machine learning model, the at least one processor is further programmed or configured to:

update the model weight of the second machine learning model based on the combined output to provide the second trained machine learning model.

7. A computer-implemented method, the method comprising:

performing, by at least one processor, an unadversarial training procedure to train a machine learning model to provide a trained machine learning model, wherein performing the unadversarial training procedure, comprises:

receiving a training dataset comprising a plurality of training samples;

generating a noise vector for the plurality of training samples based on a first uniform distribution;

perturbing each training sample of the plurality of training samples based on the noise vector to provide a plurality of perturbed training samples;

obtaining a gradient between a first output of the machine learning model that results from inputting each training sample of the plurality of training samples and a second output of the machine learning model that results from inputting each perturbed training sample of the plurality of perturbed training samples;

generating an updated noise vector based on the gradient;

perturbing each training sample of the plurality of training samples based on the updated noise vector to provide a second plurality of perturbed training samples; and updating a model weight of the machine learning model based on the second plurality of perturbed training samples to provide the trained machine learning model;

wherein the trained machine learning model is a first trained machine learning model that exploits bias features of the training dataset to make predictions, and wherein the method further comprises:

training a second machine learning model using a Product of Experts (POE) procedure based on the first trained machine learning model to provide improved predictions as compared to the first trained machine learning model.

8. The computer-implemented method of claim 7, wherein generating the noise vector for the plurality of training samples comprises:

initializing the noise vector with a uniform distribution, wherein initializing the noise vector comprises:

multiplying the first uniform distribution by a predefined radius to provide a second uniform distribution; and dividing the second uniform distribution by a square root of an input embedding size of the machine learning model to provide an initial value of the noise vector.

9. The computer-implemented method of claim 7, wherein generating the updated noise vector comprises:

multiplying the gradient by a step size.

10. The computer-implemented method of claim 7, further comprising:

restricting a value of the updated noise vector based on a predefined radius to provide a second updated noise vector;

wherein perturbing each training sample of the plurality of training samples based on the updated noise vector to provide the second plurality of perturbed training samples comprises:

perturbing each training sample of the plurality of training samples based on the second updated noise vector to provide the second plurality of perturbed training samples.

11. The computer-implemented method of claim 10, wherein training the second machine learning model using the POE procedure comprises:
generating an unnormalized output from the first trained machine learning model based on the plurality of training samples of the training dataset;
generating an unnormalized output from the second machine learning model based on the plurality of training samples of the training dataset;
combining the unnormalized output from the first trained machine learning model and the unnormalized output from the second machine learning model to provide a combined unnormalized output; and
updating a model weight of the second machine learning model based on the combined unnormalized output to provide the second trained machine learning model.

12. The computer-implemented method of claim 11, wherein generating the unnormalized output from the first trained machine learning model based on the plurality of training samples of the training dataset comprises:
generating an output of the first trained machine learning model using a first logits function based on the plurality of training samples of the training dataset;
wherein generating the unnormalized output from the second machine learning model based on the plurality of training samples of the training dataset comprises:
generating an output of the second trained machine learning model using a second logits function based on the plurality of training samples of the training dataset;
wherein combining the unnormalized output from the first trained machine learning model and the unnormalized output from the second machine learning model to provide the combined unnormalized output comprises:
combining the output of the first trained machine learning model using the first logits function based on the plurality of training samples of the training dataset and the output of the second machine learning model using the second logits function based on the plurality of training samples of the training dataset to provide a combined output; and
wherein updating the model weight of the second machine learning model based on the combined unnormalized output to provide the second trained machine learning model comprises:
updating the model weight of the second machine learning model based on the combined output to provide the second trained machine learning model.

13. A computer program product, the computer program product comprising at least one non-transitory computer-readable medium including one or more instructions that, when executed by at least one processor, cause the at least one processor to:
perform an unadversarial training procedure to train a machine learning model to provide a trained machine learning model, wherein, when performing the unadversarial training procedure, the one or more instructions cause the at least one processor to:
receive a training dataset comprising a plurality of training samples;
generate a noise vector for the plurality of training samples based on a first uniform distribution;
perturb each training sample of the plurality of training samples based on the noise vector to provide a plurality of perturbed training samples;
obtain a gradient between a first output of the machine learning model that results from inputting each training sample of the plurality of training samples and a second output of the machine learning model that results from inputting each perturbed training sample of the plurality of perturbed training samples;
generate an updated noise vector based on the gradient;
perturb each training sample of the plurality of training samples based on the updated noise vector to provide a second plurality of perturbed training samples; and
update a model weight of the machine learning model based on the second plurality of perturbed training samples to provide the trained machine learning model:
wherein the trained machine learning model is a first trained machine learning model that exploits bias features of the training dataset to make predictions, and wherein the one or more instructions further cause the at least one processor to:
train a second machine learning model using a Product of Experts (POE) procedure based on the first trained machine learning model to provide improved predictions as compared to the first trained machine learning model.

14. The computer program product of claim 13, wherein, when generating the noise vector for the plurality of training samples, the one or more instructions cause the at least one processor to:
initialize the noise vector with a uniform distribution, wherein when initializing the noise vector with the uniform distribution, the one or more instructions cause the at least one processor to:
multiply the first uniform distribution by a predefined radius to provide a second uniform distribution; and
divide the second uniform distribution by a square root of an input embedding size of the machine learning model to provide an initial value of the noise vector.

15. The computer program product of claim 13, wherein, when generating the updated noise vector, the one or more instructions cause the at least one processor to:
multiply the gradient by a step size.

16. The computer program product of claim 13, wherein, the one or more instructions further cause the at least one processor to:
restrict a value of the updated noise vector based on a predefined radius to provide a second updated noise vector; and
wherein, when perturbing each training sample of the plurality of training samples based on the updated noise vector to provide the second plurality of perturbed training samples, the one or more instructions cause the at least one processor to:
perturb each training sample of the plurality of training samples based on the second updated noise vector to provide the second plurality of perturbed training samples.

17. The computer program product of claim 13, wherein, when training the second machine learning model using the POE procedure, the one or more instructions cause the at least one processor to:
generate an unnormalized output from the first trained machine learning model based on the plurality of training samples of the training dataset;

generate an unnormalized output from the second machine learning model based on the plurality of training samples of the training dataset;

combine the unnormalized output from the first trained machine learning model and the unnormalized output from the second machine learning model to provide a combined unnormalized output; and update a model weight of the second machine learning model based on the combined unnormalized output to provide the second trained machine learning model.

18. The computer program product of claim 17, wherein, when generating the unnormalized output from the first trained machine learning model based on the plurality of training samples of the training dataset, the one or more instructions cause the at least one processor to:

generate an output of the first trained machine learning model using a first logits function based on the plurality of training samples of the training dataset;

wherein, when generating the unnormalized output from the second machine learning model based on the plurality of training samples of the training dataset, the one or more instructions cause the at least one to:

generate an output of the second trained machine learning model using a second logits function based on the plurality of training samples of the training dataset;

wherein, when combining the unnormalized output from the first trained machine learning model and the unnormalized output from the second machine learning model to provide the combined unnormalized output, the one or more instructions cause the at least one processor to:

combine the output of the first trained machine learning model using the first logits function based on the plurality of training samples of the training dataset and the output of the second machine learning model using the second logits function based on the plurality of training samples of the training dataset to provide a combined output; and wherein, when updating the model weight of the second machine learning model based on the combined unnormalized output to provide the second trained machine learning model, the one or more instructions cause the at least one processor to:

update the model weight of the second machine learning model based on the combined output to provide the second trained machine learning model.

* * * * *